US011151721B2

(12) United States Patent
Avendi et al.

(10) Patent No.: US 11,151,721 B2
(45) Date of Patent: Oct. 19, 2021

(54) SYSTEM AND METHOD FOR AUTOMATIC DETECTION, LOCALIZATION, AND SEMANTIC SEGMENTATION OF ANATOMICAL OBJECTS

(71) Applicant: Avent, Inc., Alpharetta, GA (US)

(72) Inventors: Michael R. Avendi, Irvine, CA (US); Kenneth C. Hsu, Tustin, CA (US); Shane A. Duffy, Irvine, CA (US); Dominique J. Fantasia, Irvine, CA (US); Steve S. Khalaj, Laguna Hills, CA (US); Hasnain Somji, Irvine, CA (US); Aimee T. Bui, Aliso Viejo, CA (US); Shirzad Shahriari, Irvine, CA (US); Ambar A. Avila, Irvine, CA (US); Joost L. Mulders, Costa Mesa, CA (US)

(73) Assignee: Avent, Inc., Alpharetta, GA (US)

( * ) Notice: Subject to any disclaimer, the term of this patent is extended or adjusted under 35 U.S.C. 154(b) by 199 days.

(21) Appl. No.: 16/315,237

(22) PCT Filed: Jun. 29, 2017

(86) PCT No.: PCT/US2017/039923
§ 371 (c)(1),
(2) Date: Jan. 4, 2019

(87) PCT Pub. No.: WO2018/009405
PCT Pub. Date: Jan. 11, 2018

(65) Prior Publication Data
US 2019/0311478 A1    Oct. 10, 2019

Related U.S. Application Data

(60) Provisional application No. 62/359,726, filed on Jul. 8, 2016, provisional application No. 62/429,157, filed
(Continued)

(51) Int. Cl.
*G06T 7/00*    (2017.01)
*G06T 7/11*    (2017.01)
(Continued)

(52) U.S. Cl.
CPC .......... *G06T 7/0014* (2013.01); *G06K 9/3233* (2013.01); *G06K 9/6289* (2013.01);
(Continued)

(58) Field of Classification Search
None
See application file for complete search history.

(56) References Cited

U.S. PATENT DOCUMENTS 7,876,934 B2    1/2011    Georgescu et al.
8,073,220 B2    12/2011   Khamene et al.
(Continued)

FOREIGN PATENT DOCUMENTS

JP    2013-169211 A    9/2013
WO    WO 2015/104607 A1    7/2015
(Continued)

OTHER PUBLICATIONS

Hoey, Jesse, et al. "Semi-supervised learning of a pomdp model of patient caregiver interactions." Proc. IJCAI Workshop on Modeling Others from Observations. 2005. (Year: 2005).*
(Continued)

*Primary Examiner* — Vu Le
*Assistant Examiner* — Tracy Mangialaschi
(74) *Attorney, Agent, or Firm* — Dority & Manning, P.A.

(57) ABSTRACT

The present invention is directed to a system and method for automatic detection, localization, and semantic segmentation of at least one anatomical object in a parameter space of an image generated by an imaging system. The method includes generating the image via the imaging system and providing the image of the anatomical object and surround-
(Continued)

ing tissue to a processor. Further, the method includes developing and training a parameter space deep learning network comprising convolutional neural networks to automatically detect the anatomical object and the surrounding tissue of the parameter space of the image. The method also includes automatically locating and segmenting, via additional convolutional neural networks, the anatomical object and surrounding tissue of the parameter space of the image. Moreover, the method includes automatically labeling the identified anatomical object and surrounding tissue on the image. Thus, the method also includes displaying the labeled image to a user in real time.

31 Claims, 20 Drawing Sheets

Related U.S. Application Data on Dec. 2, 2016, provisional application No. 62/500,750, filed on May 3, 2017.

(51) Int. Cl.
G06T 7/73 (2017.01)
G06K 9/62 (2006.01)
G06K 9/32 (2006.01)
G06K 9/72 (2006.01)

(52) U.S. Cl.
CPC ............... G06K 9/726 (2013.01); G06T 7/11 (2017.01); G06T 7/75 (2017.01); G06K 2209/051 (2013.01); G06T 2207/10016 (2013.01); G06T 2207/20081 (2013.01); G06T 2207/20084 (2013.01); G06T 2207/30004 (2013.01)

(56) References Cited

U.S. PATENT DOCUMENTS

| | | | |
|---|---|---|---|
| 8,172,753 B2 | 5/2012 | Halmann | |
| 8,175,362 B2 | 5/2012 | Sathyanarayana | |
| 8,867,802 B2 | 10/2014 | Criminisi et al. | |
| 9,153,022 B2 | 10/2015 | Finkelstein et al. | |
| 9,256,962 B2 | 2/2016 | Berry et al. | |
| 9,384,413 B2 | 7/2016 | John et al. | |
| 9,569,736 B1* | 2/2017 | Ghesu | G06N 7/005 |
| 2009/0103794 A1 | 4/2009 | Sathyanarayana | |
| 2010/0010348 A1 | 1/2010 | Halmann | |
| 2011/0182493 A1 | 7/2011 | Huber et al. | |
| 2011/0188715 A1 | 8/2011 | Shotton et al. | |
| 2013/0336553 A1 | 12/2013 | Buisseret et al. | |
| 2014/0129200 A1 | 5/2014 | Bronstein et al. | |
| 2015/0148657 A1 | 5/2015 | Shashar et al. | |
| 2015/0164605 A1 | 6/2015 | Patwardhan et al. | |
| 2015/0173701 A1 | 6/2015 | Major et al. | |
| 2015/0265251 A1 | 9/2015 | Cho et al. | |
| 2016/0012604 A1 | 1/2016 | Firouzian et al. | |
| 2016/0015469 A1* | 1/2016 | Goshayesh | A61B 1/0005 600/424 |
| 2016/0042510 A1 | 2/2016 | Littell | |
| 2016/0042511 A1 | 2/2016 | Chukka et al. | |
| 2016/0058422 A1 | 3/2016 | Lee et al. | |
| 2016/0092748 A1 | 3/2016 | Koktava et al. | |
| 2016/0106321 A1 | 4/2016 | Sharma et al. | |
| 2016/0125595 A1 | 5/2016 | Silbert et al. | |
| 2016/0174902 A1* | 6/2016 | Georgescu | A61B 5/7267 600/408 |
| 2016/0287214 A1 | 10/2016 | Ralovich et al. | |
| 2016/0300343 A1* | 10/2016 | Gazit | G16H 50/50 |
| 2016/0328643 A1 | 11/2016 | Liu et al. | |

FOREIGN PATENT DOCUMENTS

| | | |
|---|---|---|
| WO | WO 2015/109254 A2 | 7/2015 |
| WO | WO 2015/175806 A1 | 11/2015 |
| WO | WO 2015/191414 A2 | 12/2015 |
| WO | WO 2015/195609 A1 | 12/2015 |

OTHER PUBLICATIONS

Shakeri M, Tsogkas S, Ferrante E, Lippe S, Kadoury S, Paragios N, Kokkinos I. Sub-cortical brain structure segmentation using F-CNN's. In 2016 IEEE 13th International Symposium on Biomedical Imaging (ISBI) Apr. 13, 2016 (pp. 269-272). IEEE. (Year: 2016).*
Dai et al., "Instance-aware Semantic Segmentation via Multi-task Network Cascades", 2016 IEEE Conference on Computer Vision and Pattern Recognition, Jun. 27, 2016, pp. 3150-3158.
Hadjerci et al., "On-line Learning Dynamic Models for Nerve Detection in Ultrasound Videos", 2016 IEEE International Conference on Image Processing, Sep. 25, 2016, pp. 131-135.
Hoey et al., "Semi-supervised learning of a POMDP model of Patient-Caregiver Interactions", IJCAI Workshop on Modeling Others from Observations, Jul. 30, 2005, 9 pages.
Hong et al., "Decoupled Deep Neural Network for Semi-supervised Semantic Segmentation", Advances in Neural Information Processing Systems 28, Dec. 7, 2015, pp. 1-9.
Reddy D. Manikanta, "On segmentation of Nerve Structures in Ultrasound Images", retrieved from the Internet: https://manikantareddyd.github.io/posts/2016/11/16/ultrasound-nerve-segmentations, Nov. 16, 2016, pp. 1-27.
International Search Report for PCT/US2017/039923, dated Sep. 7, 2017, 18 pages.

* cited by examiner

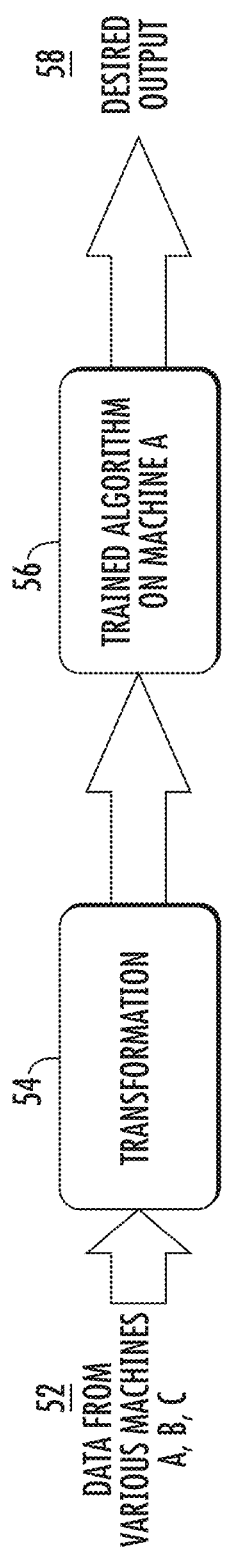
FIG. 10
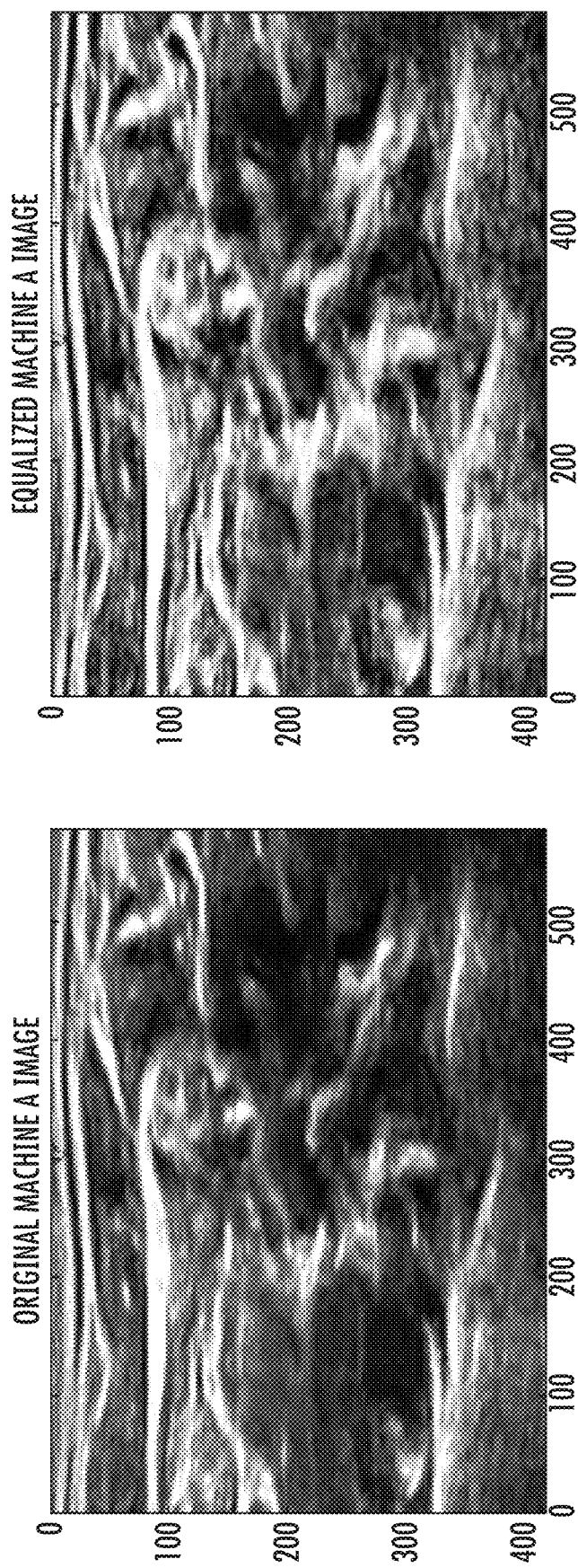
FIG. 12
FIG. 11

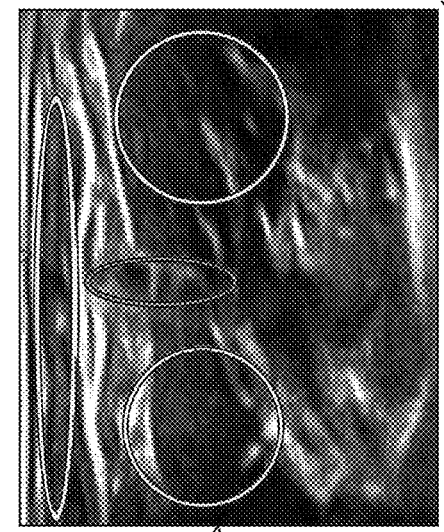
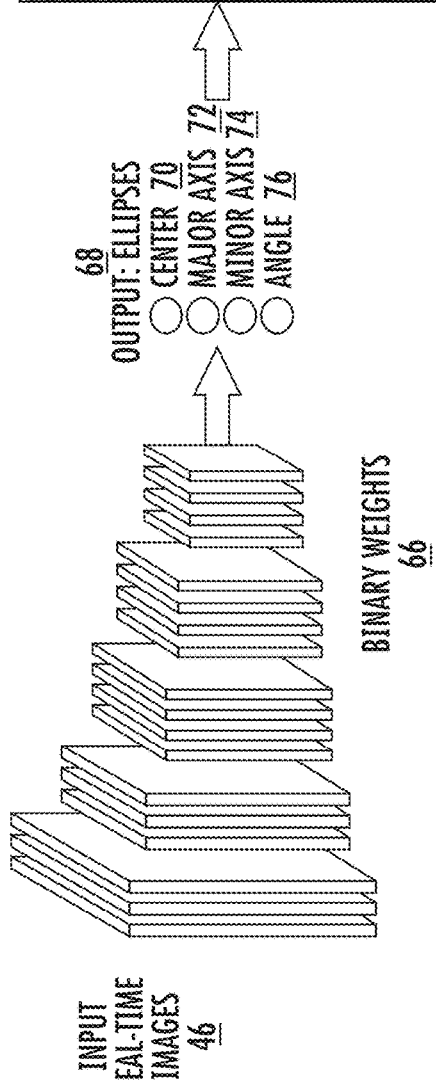
FIG. 23
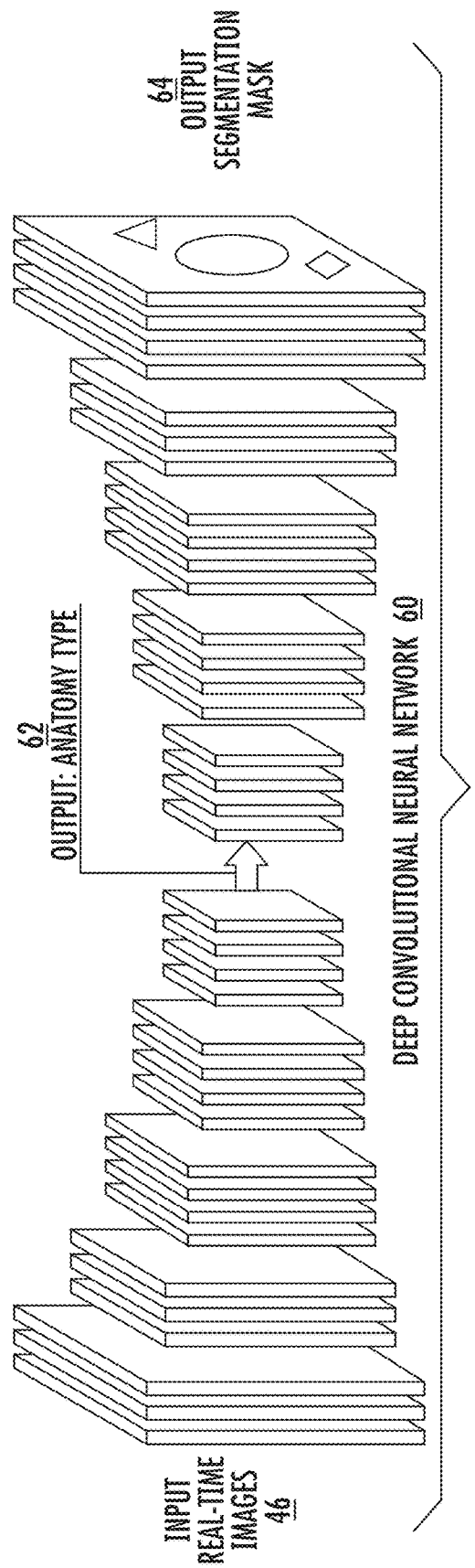
FIG. 24

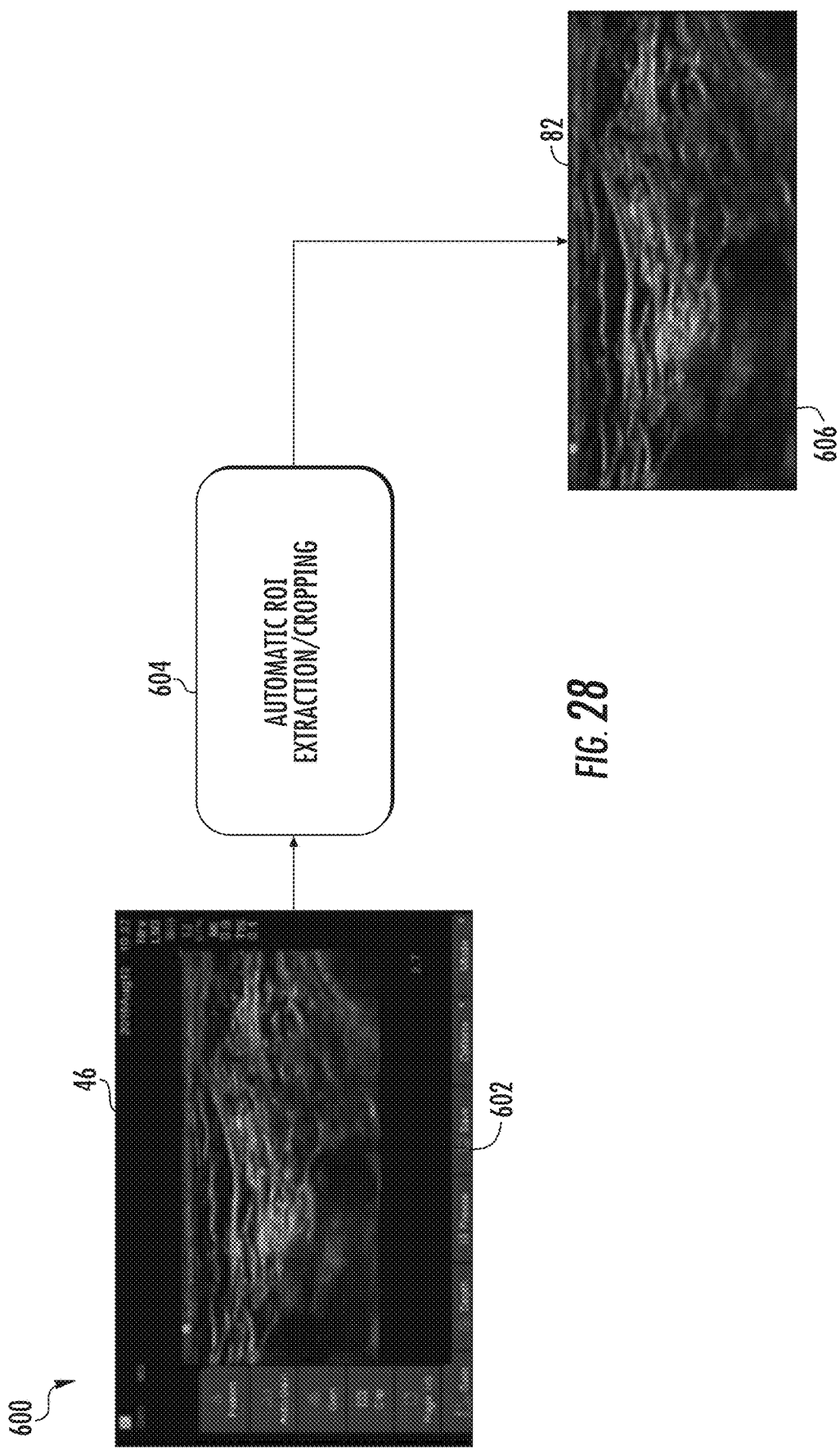

SYSTEM AND METHOD FOR AUTOMATIC DETECTION, LOCALIZATION, AND SEMANTIC SEGMENTATION OF ANATOMICAL OBJECTS

RELATED APPLICATION

The present application is the national stage entry of international Patent Application No. PCT/US2017/039923 having a filing date of Jun. 29, 2017 which claims priority to U.S. Provisional Application Ser. No. 62/359,726, having a filing date of Jul. 8, 2016, U.S. Provisional Application Ser. No. 62/429,157, having a filing date of Dec. 2, 2016, and U.S. Provisional Application Ser. No. 62/500,750, having a filing date of May 3, 2017, all of which are incorporated herein in their, entirety by reference, thereto.

FIELD OF THE INVENTION

The present invention relates to anatomical object detection in the field of medical imaging, and more particularly, to a system and method for automatic detection, localization, and semantic segmentation of anatomical objects using deep learning algorithms.

BACKGROUND

Detecting and segmentation of anatomical objects is an essential task in medical imaging that supports clinical imaging workflow from diagnosis, patient stratification, therapy planning, intervention, and/or follow-up. As such, it is important that detection and segmentation of anatomical objects and surrounding tissue occurs quickly and robustly.

Various systems based on traditional approaches exist for addressing the problem of anatomical detection and tracking in medical images, such as computed tomography (CT), magnetic resonance (MR), ultrasound, and fluoroscopic images. However, anatomical object detection using such systems is not always robust, especially for some challenging detection problems in which the anatomical objects exhibit large variations in anatomy, shape, and/or appearance, as well as noise and artifacts in the medical images. For example, for certain nerve block procedures, it is often difficult for a physician to quickly and accurately locate a nerve bundle via an ultrasound imaging system.

Accordingly, the present disclosure is directed to a system and method for automatic detection, localization, and semantic segmentation of anatomical objects, such as nerve blocks, using deep learning algorithms that can be implemented via existing imaging systems.

SUMMARY OF THE INVENTION

Objects and advantages of the invention will be set forth in part in the following description, or may be obvious from the description, or may be learned through practice of the invention.

In one aspect, the present invention is directed to a method for automatic detection, localization, and segmentation of at least one anatomical object in a parameter space of an image generated by an imaging system. The method includes providing the image of the anatomical object and surrounding tissue to a processor. Further, the method includes developing and training a parameter space deep learning network having one or more deep convolutional neural networks to automatically detect the anatomical object and the surrounding tissue of the parameter space of the image. The method also includes automatically locating and segmenting, via an additional deep convolutional neural network, the anatomical object and surrounding tissue of the parameter space of the image. Moreover, the method includes automatically labeling the anatomical object and surrounding tissue on the image. Thus, the method also includes displaying the labeled image to a user.

In one embodiment, the anatomical object(s) and surrounding tissue may include any anatomy structure and/or surrounding tissue of a patient, including but not limited to a brachial plexus, interscalene muscle, sternocleidomastoid muscle, middle scalene muscle, anterior scalene muscle, supraclavicular muscle, infraclavicular muscle, axillary muscle, lumbar plexus, fascia iliac, femoral nerve, sciatic nerve, abductor canal, popliteal nerve, popliteal artery, popliteus muscle, saphenous vein, saphenous nerve, intercostal space, transversus abdominus plane, thoracic paravertebral space, or similar.

In another embodiment, the method may include training the deep neural network to automatically detect the parameter space of the image containing the anatomical object and surrounding tissue via ground truth data. More specifically, in certain embodiments, the step of developing and training the deep neural network to automatically detect the anatomical object and surrounding tissue of the parameter space of the image may include scanning and collecting a dataset of images of the anatomical object and surrounding tissue from a plurality of patients, annotating the dataset of images based on user (e.g., medical professional) input to create the ground truth data, dividing the dataset of images and the ground truth data into a training dataset and a validation dataset, and utilizing the training dataset to train the deep neural network.

In further embodiments, the step of utilizing the training dataset to train the deep neural network may include optimizing a cost function to minimize an error between an output of the deep neural network and the ground truth data. More specifically, in certain embodiments, the step of optimizing the cost function to minimize the error may include utilizing a stochastic gradient descent (SGD) algorithm that iteratively processes portions of the ground truth data and adjusts one or more parameters of the deep neural network based on the error between the output of the deep neural network and the ground truth data.

In yet another embodiment, the method may include, after optimizing the cost function, utilizing the deep neural network in real-time to automatically provide predictions on the validation data and comparing the predictions with the ground truth data to ensure that the deep neural network is able to generalize.

In still additional embodiments, the step of annotating the dataset of images based on user input to create the ground truth data may include manually identifying and annotating the anatomical object and surrounding tissue in each image of the dataset.

In further embodiments, the step of automatically locating and segmenting the anatomical object and the surrounding tissue of the parameter space of the image may include segmenting the anatomical object and the surrounding tissue via semantic segmentation.

In another embodiment, the method also includes initially training the deep neural network to automatically detect the parameter space of the imaging system containing the anatomical object and the surrounding tissue offline. In yet another embodiment, the method may include continuously training the deep neural network to automatically detect the parameter space of the imaging system containing the anatomical object and the surrounding tissue online.

In additional embodiments, the step of automatically labeling the anatomical object and surrounding tissue on the image may include at least one of outlining the anatomical object and the surrounding tissue on the image or overlaying a descriptive label atop each of the at least one anatomical object and the surrounding tissue.

In yet another embodiment, the step of automatically locating and segmenting the anatomical object and the surrounding tissue of the parameter space of the image via the additional convolution network includes extracting an area of interest around the anatomical object from the image.

In still another embodiment, the image of the anatomical object and surrounding tissue is automatically cropped prior to providing the image to the processor.

In another aspect, the present disclosure is directed to an imaging system. More specifically, in certain embodiments, the imaging system may correspond to an ultrasound imaging system, a computer tomography (CT) scanner, a magnetic resonance imaging (MRI) scanner, or similar. In addition, the imaging system includes at least one processor configured to perform one or more operations and a user display. More specifically, the one or more operations include but are not limited to receiving an image of at least one anatomical object and surrounding tissue, developing and training a parameter space deep learning network to automatically detect the anatomical object and the surrounding tissue of the parameter space of the image, automatically locating and segmenting, via an additional deep neural network, the anatomical object and surrounding tissue of the parameter space of the image, and automatically labeling the anatomical object and surrounding tissue on the image. Further, the user display is configured to display the labeled image to a user.

In another embodiment, the deep learning network may include one or more deep convolutional neural networks, one or more recurrent neural networks, or any other suitable neural networks. It should also be understood that the imaging system may be further configured to implement any of the method steps and/or features as described herein.

In yet another aspect, the present disclosure is directed a method for automatic detection, localization, and semantic segmentation of at least one anatomical object in a parameter space of an image generated by an imaging system. The method includes providing the image of the anatomical object and surrounding tissue to a processor. The method also includes developing and training a parameter space deep learning network to automatically detect the anatomical object and the surrounding tissue of the parameter space of the image. Further, the method includes automatically locating and semantically segmenting, via one or more deep learning algorithms, the anatomical object and the surrounding tissue of the parameter space of the image. In addition, the method includes automatically labeling the anatomical object and the surrounding tissue on the image and displaying the labeled image to a user. It should also be understood that the method may further include any of the additional steps and/or features as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 10 illustrates a schematic diagram of a method for pre-processing an image generated by an imaging system according to the present disclosure;

FIG. 11 illustrates an image from a first ultrasound machine (e.g., machine A) that has not been transformed according to the method of FIG. 10;

FIG. 12 illustrates an image from a first ultrasound machine (e.g., machine A) that has been transformed according to the method of FIG. 10;

FIG. 23 illustrates a schematic diagram of one embodiment of a method for automatically segmenting at least one anatomical object in a parameter space of an image generated by an imaging system using low computational power devices according to the present disclosure;

FIG. 24 illustrates a schematic diagram of one embodiment of a method for the simultaneous automatic detection and segmentation of at least one anatomical object in a parameter space of an image generated by an imaging system according to the present disclosure;

FIG. 28 illustrates a flow diagram of one embodiment of a method for automatic data cleaning where a region of interest is detected in an original image, where the clean, cropped version of the original image is used in subsequent steps such as image annotations, deep learning, etc.

DETAILED DESCRIPTION OF THE INVENTION

Figure 1:
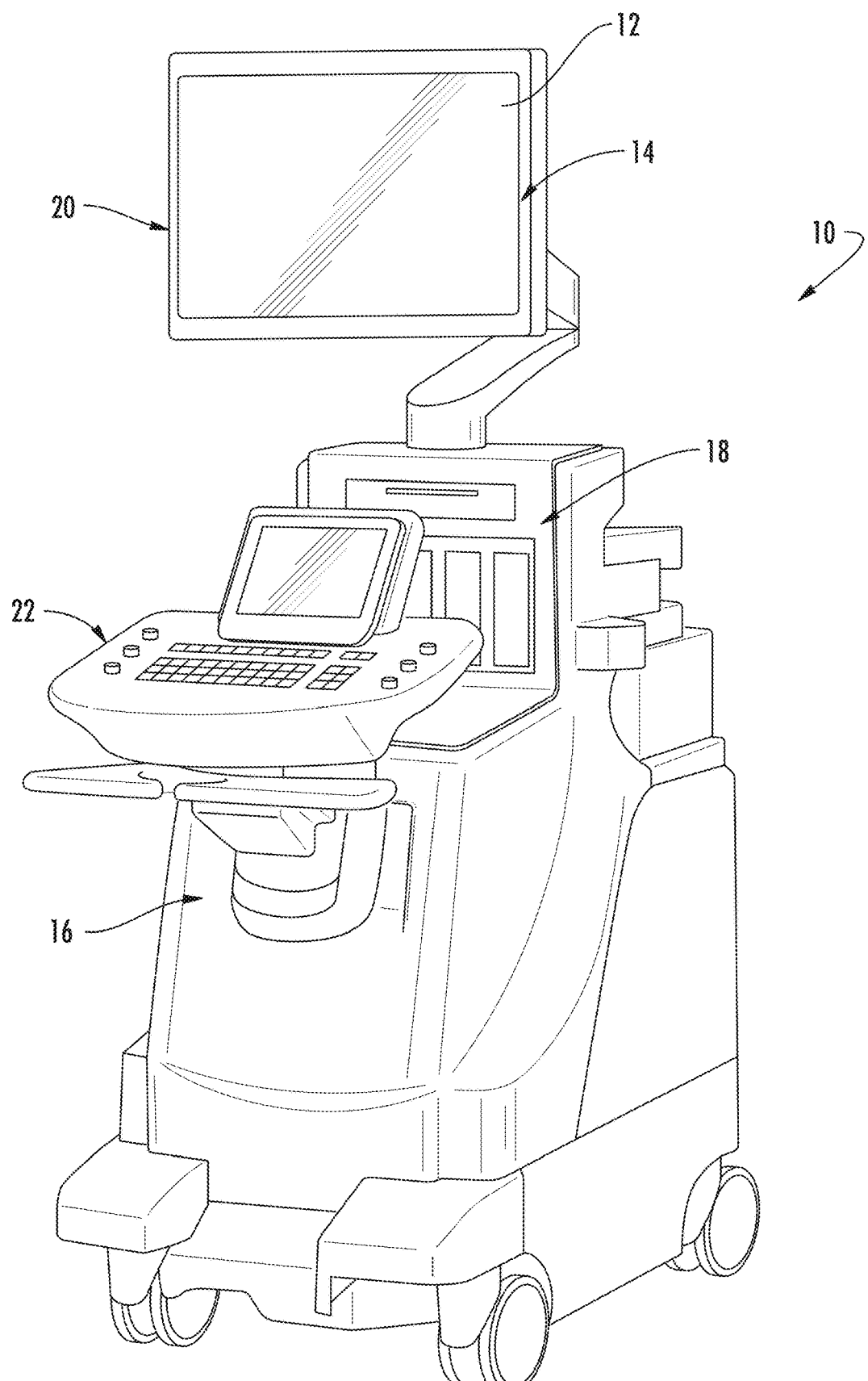
FIG. 1 illustrates a perspective view of one embodiment of an imaging system according to the present disclosure.

Reference will now be made in detail to one or more embodiments of the invention, examples of the invention, examples of which are illustrated in the drawings. Each example and embodiment is provided by way of explanation of the invention, and is not meant as a limitation of the invention. For example, features illustrated or described as part of one embodiment may be used with another embodiment to yield still a further embodiment. It is intended that the invention include these and other modifications and variations as coming within the scope and spirit of the invention.

Figure 2:
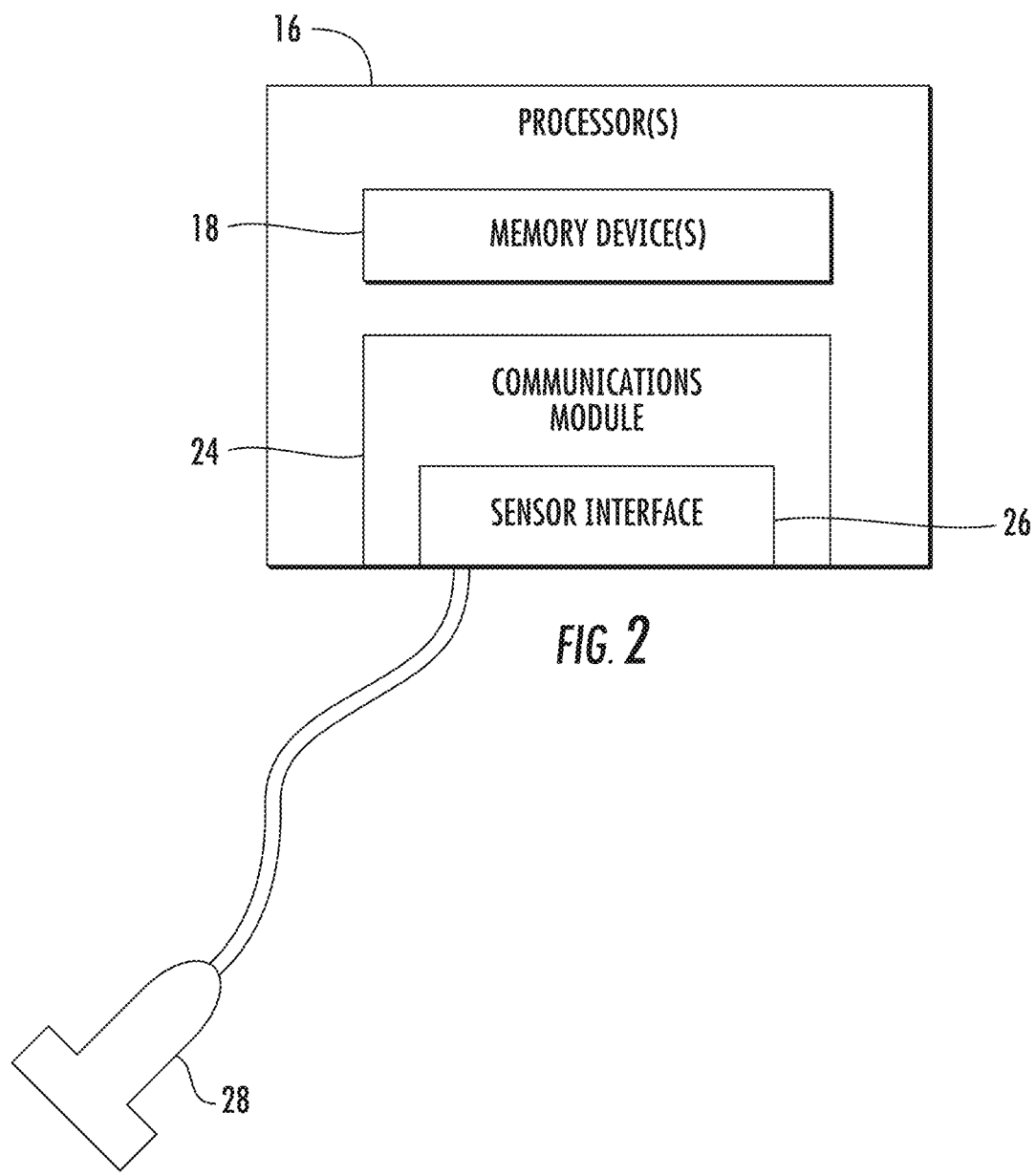
FIG. 2 illustrates a block diagram one of embodiment of a processor of an imaging system according to the present disclosure.

Generally, the present disclosure is directed to a system and method for automatic detection, localization, and semantic segmentation of one or more anatomical objects in a parameter space of an image generated by an imaging system, such as an ultrasound imaging system. More specifically, referring now to the drawings, FIGS. 1 and 2 illustrate one embodiment of an imaging system 10 and associated processor 16 configured to detect, localize, and segment one or more anatomical objects in a parameter space 12 of an image 14 generated by the imaging system 10. As used herein, the imaging system 10 may correspond to an ultrasound imaging system (as shown), a computer tomography (CT) scanner, a magnetic resonance imaging (MRI) scanner, or any other suitable imaging system that can benefit from the present technology. More specifically, as shown, the imaging system 10 generally includes one or more processor(s) 16 and associated memory device(s) 18 configured to perform a variety of computer-implemented functions (e.g., performing the methods and the like and storing relevant data as disclosed herein), as well as a user display 20. In addition, the imaging system 10 may include a user interface 22, such as a computer and/or keyboard, configured to assist a user in generating and/or manipulating the parameter space 12 of the image 14.

Additionally, as shown in FIG. 2, the processor(s) 16 may also include a communications module 24 to facilitate communications between the processor(s) 16 and the various components of the imaging system 10, e.g. any of the components of FIG. 1. Further, the communications module 24 may include a sensor interface 26 (e.g., one or more analog-to-digital converters) to permit signals transmitted from one or more probes (e.g. the ultrasound probe 28) to be converted into signals that can be understood and processed by the processor(s) 16. It should be appreciated that the ultrasound probe 28 may be communicatively coupled to the communications module 24 using any suitable means. For example, as shown in FIG. 2, the ultrasound probe 28 may be coupled to the sensor interface 26 via a wired connection. However, in other embodiments, the ultrasound probe 28 may be coupled to the sensor interface 26 via a wireless connection, such as by using any suitable wireless communications protocol known in the art. As such, the processor(s) 16 may be configured to receive one or more signals from the ultrasound probe 28.

As used herein, the term "processor" refers not only to integrated circuits referred to in the art as being included in a computer, but also refers to a controller, a microcontroller, a microcomputer, a programmable logic controller (PLC), an application specific integrated circuit, a field-programmable gate array (FPGA), and other programmable circuits. The processor(s) 16 is also configured to compute advanced control algorithms and communicate to a variety of Ethernet or serial-based protocols (Modbus, OPC, CAN, etc.). Furthermore, in certain embodiments, the processor(s) 16 may communicate with a server through the Internet for cloud computing in order to reduce the computation time and burden on the local device. Additionally, the memory device(s) 18 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 18 may generally be configured to store suitable computer-readable instructions that, when implemented by the processor(s) 16, configure the processor(s) 16 to perform the various functions as described herein.

Referring now to FIGS. 3-7, a flow diagram (FIG. 3) of one embodiment of a method 100 for automatic detection, localization, and segmentation of at least one anatomical object 30 in the parameter space 12 of the image 14 generated by an imaging system 10 is illustrated, as well as various embodiments of screen shots (FIGS. 4-7) from the user display 20 illustrating the parameter space 12 of the image 14. In certain embodiments, the anatomical object(s) 30 and the surrounding tissue 32 as described herein may include any anatomy structure and/or surrounding tissue of the anatomy structure of a patient. More specifically, as shown in the illustrated embodiments of FIGS. 4-7, the anatomical object(s) 30 may include an interscalene brachial plexus (BP) 34 of the patient, which generally corresponds to the network of nerves running from the spine, formed by the anterior rami of the lower four cervical nerves and first thoracic nerve. As such, the brachial plexus 34 passes through the cervicoaxillary canal in the neck, over the first rib, and into the axilla (i.e. the armpit region), where it innervates the upper limbs and some neck and shoulder muscles. As such, the surrounding tissue 32 of the brachial plexus 34 generally corresponds to the sternocleidomastoid muscle (SM) 36, the middle scalene muscle (MCM) 38, the anterior scalene muscle (ASM) 40, and/or similar. The field of view or parameter space 12 of such anatomical structures is generally difficult for physicians to capture. Thus, the system and method of the present disclosure provides an improved method for detecting, locating and/or segmenting the field of view containing the BP and the surrounding tissues mentioned herein.

Figure 4:
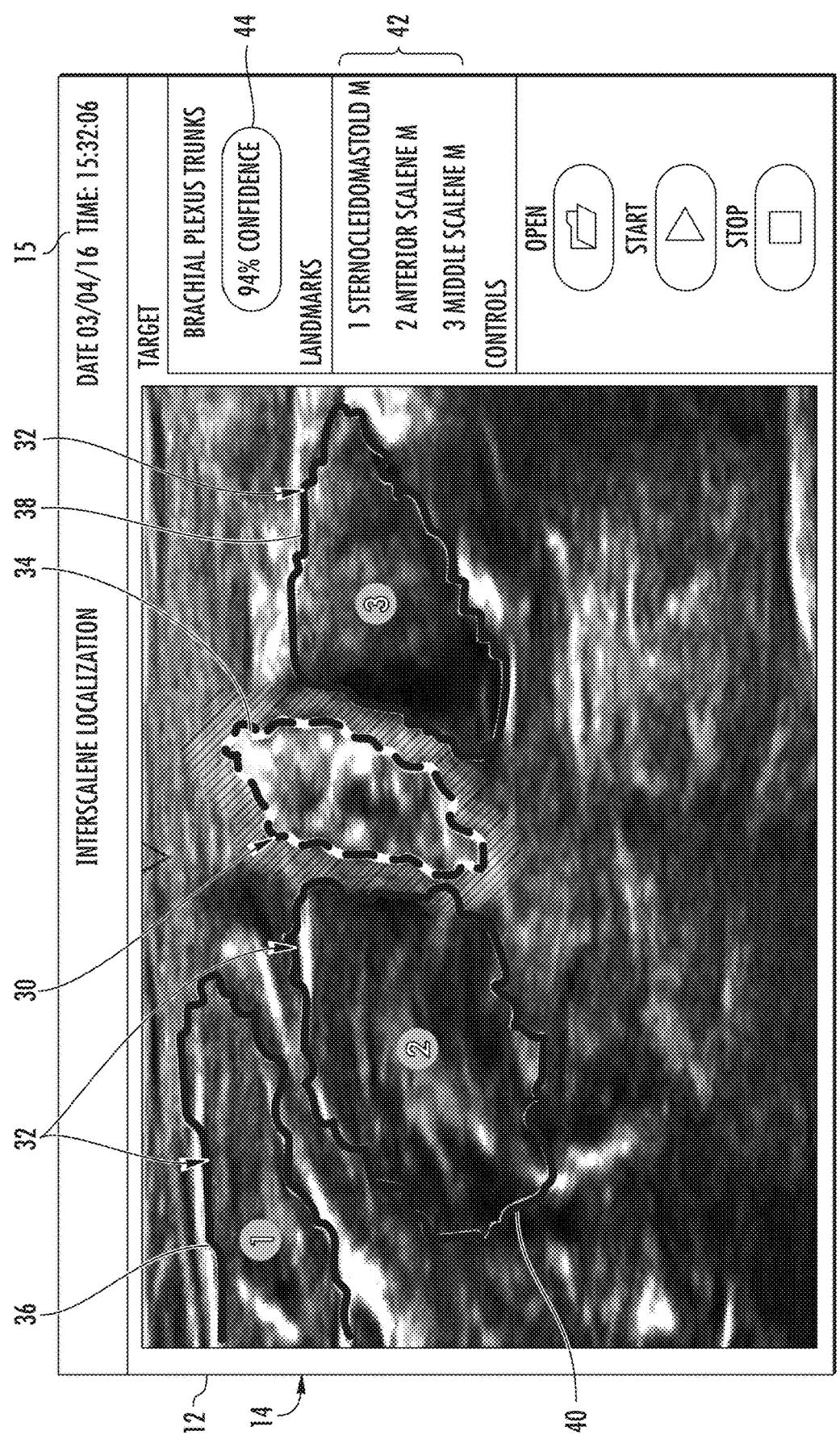
FIG. 4 illustrates a schematic diagram of one embodiment of a parameter space of an image generated by an imaging system according to the present disclosure, particularly illustrating interscalene localization of the brachial plexus of a patient with the surrounding tissue outlined and numbered.
Figure 5:
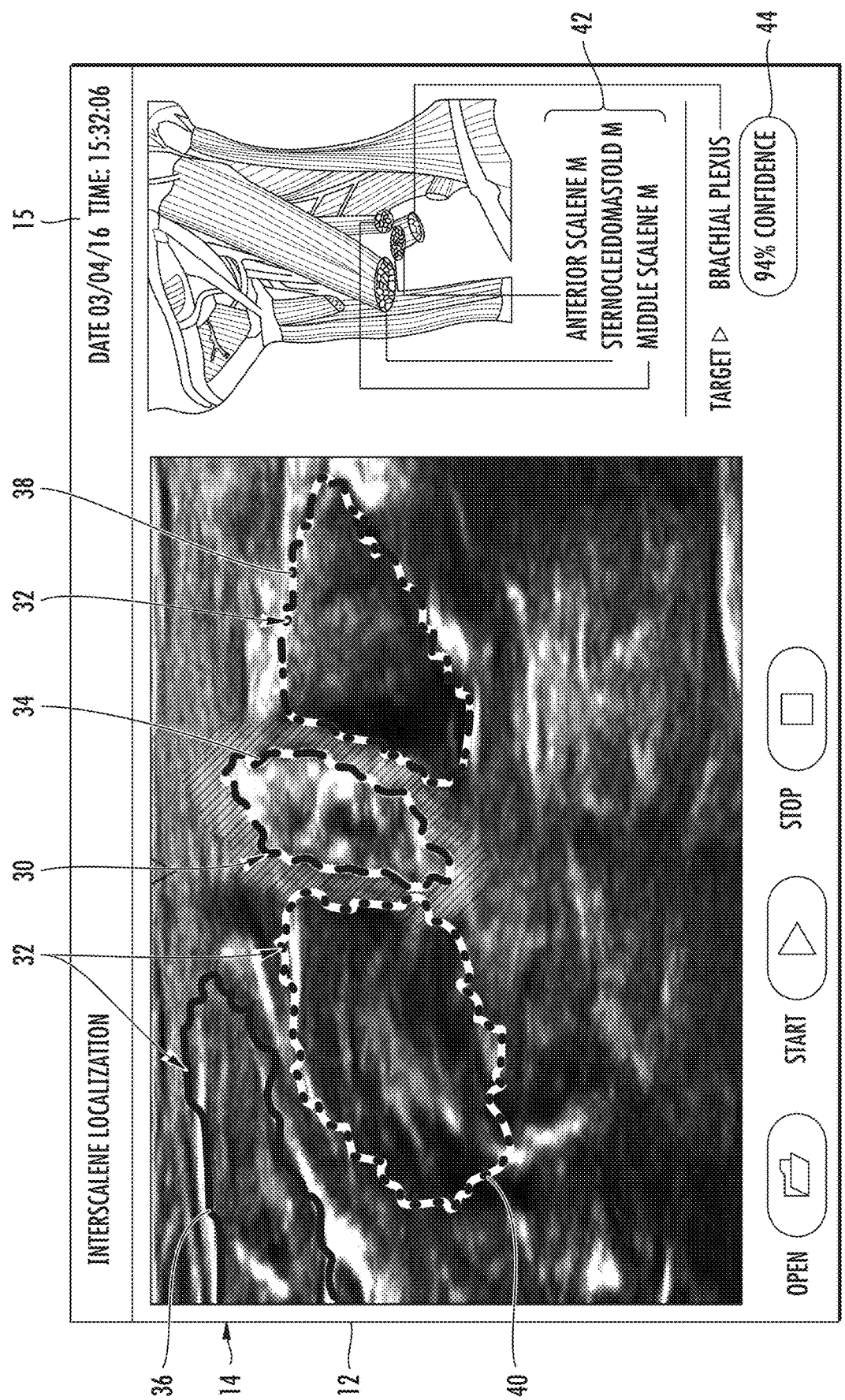
FIG. 5 illustrates a schematic diagram of another embodiment of a parameter space of an image generated by an imaging system according to the present disclosure, particularly illustrating interscalene localization of the brachial plexus of a patient with the surrounding tissue outlined and numbered.
Figure 6:
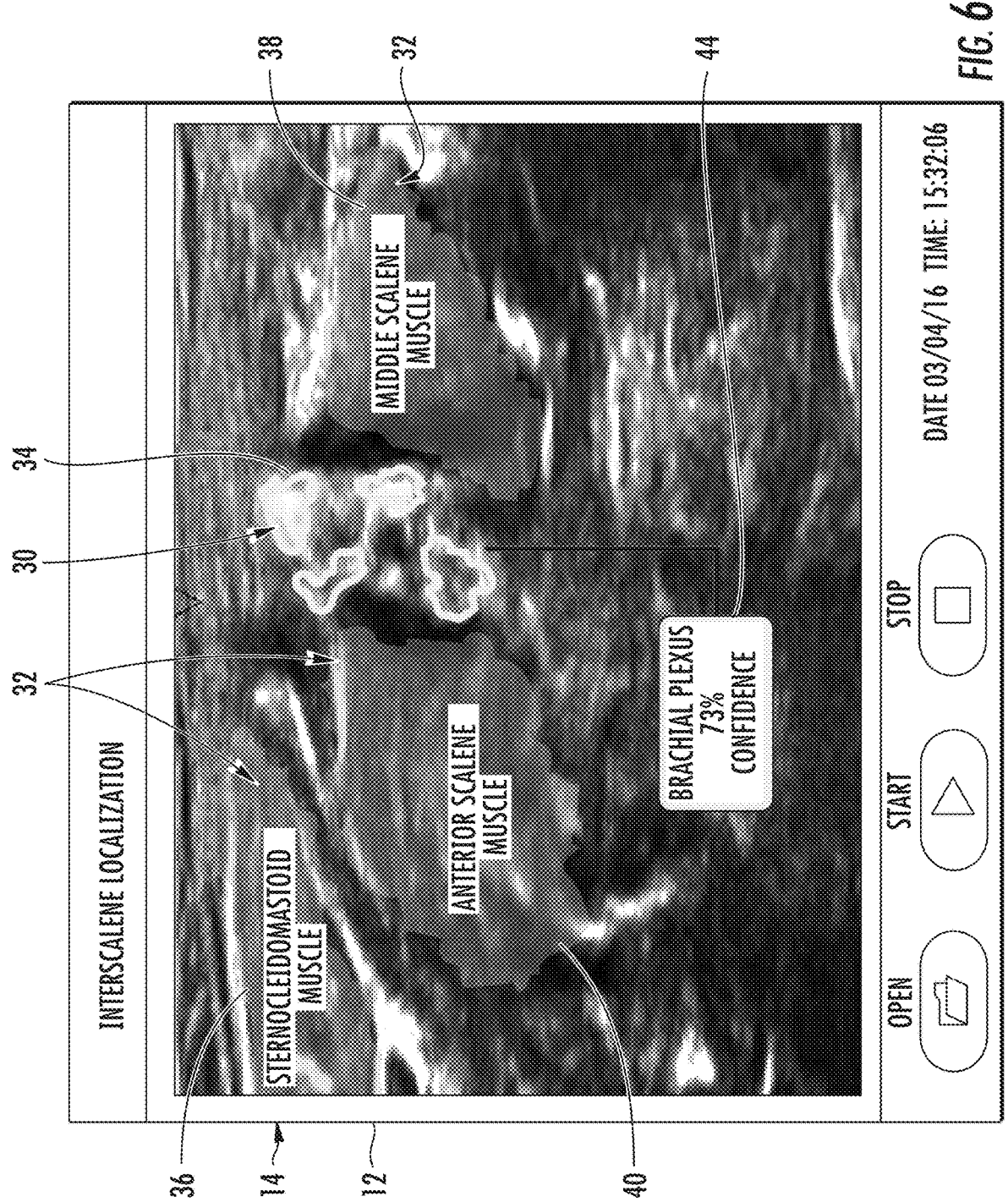
FIG. 6 illustrates a schematic diagram of yet another embodiment of a parameter space of an image generated by an imaging system according to the present disclosure, particularly illustrating interscalene localization of the brachial plexus of a patient with the surrounding tissue shaded.

It should be understood, however, that the system and method of the present disclosure may be further used for any variety of medical procedures involving any anatomy structure in addition to those relating to the brachial plexus 34. For example, the anatomical object(s) 30 and the surrounding tissue 32 may include upper and lower extremities as well as compartment blocks. More specifically, in such embodiments, the anatomical object(s) 30 and the surrounding tissue 32 of the upper extremities may include interscalene muscle, supraclavicular muscle, infraclavicular muscle, and/or axillary muscle nerve blocks, which all block the brachial plexus (a bundle of nerves to the upper extremity), but at different locations. Further, the anatomical object(s) 30 and the surrounding tissue 32 of the lower extremities may include the lumbar plexus, the fascia Iliac, the femoral nerve, the sciatic nerve, the abductor canal, the popliteal, the saphenous (ankle), and/or similar. In addition, the anatomical object(s) 30 and the surrounding tissue 32 of the compartment blocks may include the intercostal space, transversus abdominus plane (TAP), and thoracic paravertebral space, and/or similar. Further, as shown in FIGS. 4 and 5, the image 14 generated by the imaging system 10 may include the parameter space 12 as well as an optional task bar 15 located adjacent thereto. In addition, the task bar 15 may include other suitable control features such as open, start, and stop buttons as well as the date and time. In alternative embodiments, as shown in FIGS. 5 and 6, the task bar 15 may be omitted. It should also be understood that the image 14 may further include any other suitable control and/or display features and may be controlled via the user interface 22 or via touch-screen capabilities.

Referring particularly to FIG. 2, as shown at 102, the method 100 includes generating the image 14 via the imaging system 10 and providing the entire image 14 of the anatomical object 30 and/or the surrounding tissue 32 to the processor(s) 16. Further, as shown at 104, the method 100 includes developing and training a parameter space deep learning network to automatically detect the anatomical object 30 and/or the surrounding tissue 32 of the parameter space 12 of the image 14. More specifically, in certain embodiments, the parameter space deep learning network may include one or more deep convolutional neural networks (CNNs), one or more recurrent neural networks, or any other suitable neural network configurations. In machine learning, deep convolutional neural networks generally refer to a type of feed-forward artificial neural network in which the connectivity pattern between its neurons is inspired by the organization of the animal visual cortex, whose individual neurons are arranged in such a way that they respond to overlapping regions tiling the visual field. In contrast, recurrent neural networks (RNNs) generally refer to a class of artificial neural networks where connections between units form a directed cycle. Such connections create an internal state of the network which allows the network to exhibit dynamic temporal behavior. Unlike feed-forward neural networks (such as convolutional neural networks), RNNs can use their internal memory to process arbitrary sequences of inputs. As such, RNNs can extract the correlation between the image frames in order to better identify and track anatomical objects in real time.

In certain embodiments, the processor(s) 16 may use ground truth data to train and/or develop the deep neural network to automatically detect the parameter space 12 of the image 14 containing the anatomical object 30 and/or the surrounding tissue 32. For example, in particular embodiments, the processor(s) 16 may be configured to initially train the parameter space deep neural network to automatically detect the parameter space 12 containing the anatomical object(s) 30 and/or the surrounding tissue 32. More specifically, in certain embodiments, the initial training may be completed while the processor(s) 16 is offline. In another embodiment, the processor(s) 16 may be configured to continuously train the deep neural network online to automatically detect the parameter space 12 containing the anatomical object(s) 30 and/or the surrounding tissue 32, e.g. after the initial training is complete.

More specifically, in particular embodiments, the processor(s) 16 may be configured for online learning to continuously train the deep neural network from newly captured data in the field to automatically detect the anatomical object 30 and/or the surrounding tissue 32 of the parameter space 12 by scanning and collecting a dataset of images of the anatomical object 30 and/or the surrounding tissue 32 from multiple patients. For example, in certain embodiments, hundreds and/or thousands of images may be scanned and collected from multiple patients and stored in the dataset via the memory device(s) 18. Further, before storing, the dataset of images may be annotated based on user input to create the ground truth data. For example, in certain embodiments, physicians may annotate and manually identify the dataset of images based on expert knowledge to assist the deep learning network in detecting and identifying the anatomical object(s) 30 and/or the surrounding tissue 32 in each image of the dataset. As such, the ground truth data as described herein generally refers to information provided by direct observation of experts in the field as opposed to information provided by inference. Thus, the parameter space deep learning network of the present disclosure is configured to mimic a human brain during operation.

In particular embodiments, the dataset of images can then be divided into a plurality of groups. For example, in one embodiment, the ground truth data may be divided into at least two groups including a training dataset and a validation dataset. As such, in particular embodiments, the processor(s) 16 are configured to utilize the training dataset to train the parameter space deep neural network. More specifically, in certain embodiments, the processor(s) 16 may be configured to optimize a cost function to minimize an error between an output of the deep neural network and the ground truth data. For example, in one embodiment, the step of optimizing the cost function to minimize the error may include utilizing a stochastic approximation, such as a stochastic gradient descent (SGD) algorithm, that iteratively processes portions of the ground truth data and adjusts one or more parameters of the deep neural network based on the error between the output of the deep neural network and the ground truth data. As used herein, a stochastic gradient descent generally refers to a stochastic approximation of the gradient descent optimization method for minimizing an objective function that is written as a sum of differentiable functions. More specifically, in one embodiment, the processor(s) 16 may be configured to implement supervised learning to minimize the error between the output of the deep neural network and the ground truth data. As used herein, "supervised learning" generally refers to the machine learning task of inferring a function from labeled training data.

However, it should be understood that the cost function can be defined in different ways and can be optimized using various methods. For example, in additional embodiments, the processor(s) 16 may implement further deep learning techniques, such as reinforcement learning, unsupervised learning, and/or any other techniques now known or later developed in the art. Such methods may require less training data and/or rely on a reward/punishment function such that the systems do not need to be specifically provided with labeled data.

In another embodiment, the method 100 may also include, after optimizing the cost function, utilizing the parameter space neural network in real-time to automatically provide predictions on the validation data as well the newly captured data. Thus, in such embodiments, the processor(s) 16 may be configured to compare the predictions with the ground truth data to ensure that the deep neural network is able to generalize. In other words, the processor(s) 16 may be configured to ensure that the deep neural network can provide accurate predictions for cases falling outside of the training data.

Figure 3:
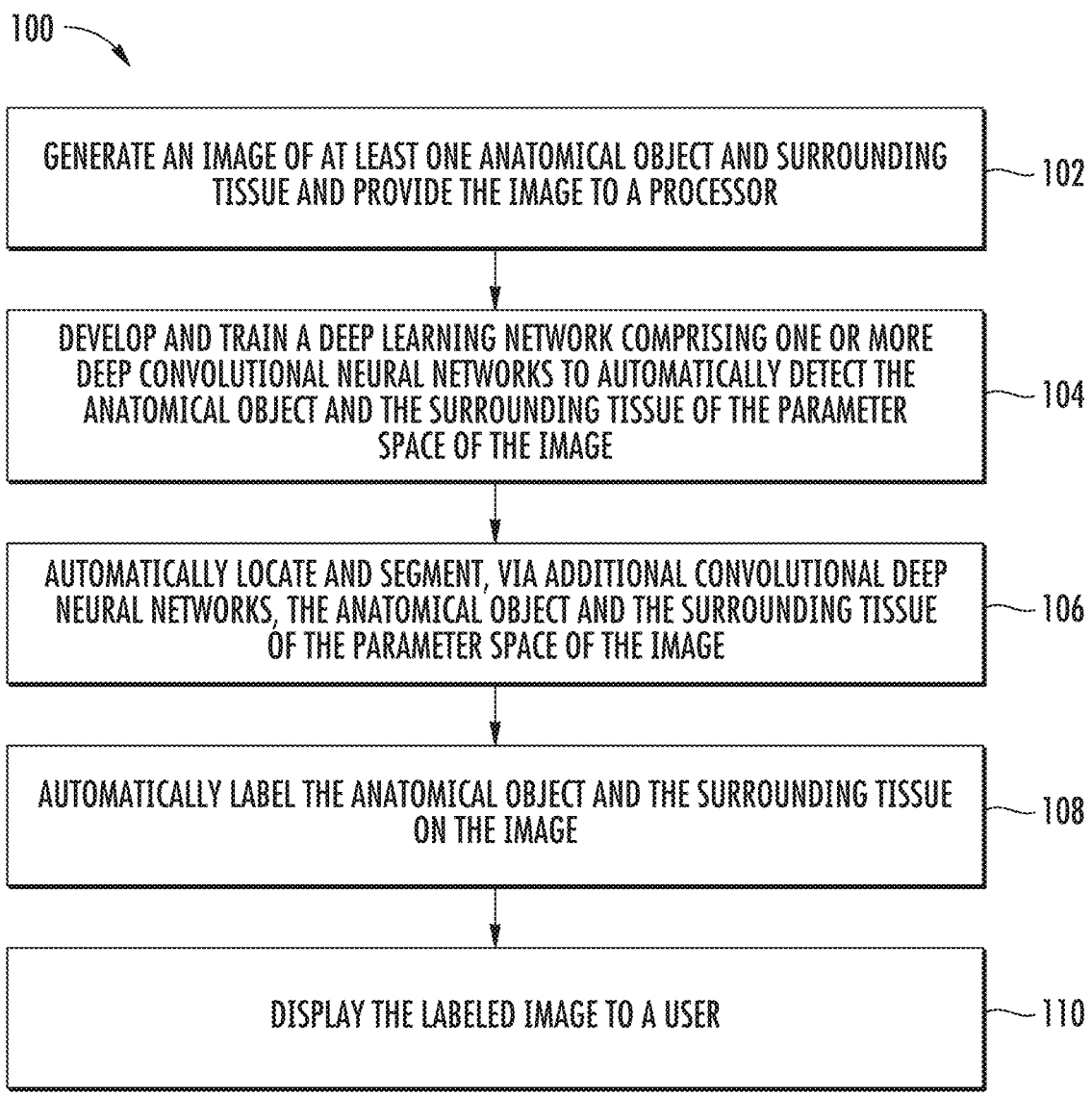
FIG. 3 illustrates a flow diagram of one embodiment of a method for automatic detection, localization, and segmentation of at least one anatomical object in a parameter space of an image generated by an imaging system according to the present disclosure.

Referring still to FIG. 3, as shown at 106, the method 100 also includes automatically locating and segmenting, via an additional deep neural network, the anatomical object 30 and/or the surrounding tissue 32 of the parameter space 12 of the image 14. The additional deep neural network can be trained according to any of the suitable methods as described herein and for any particular purpose. For example, the deep neural network may first be trained to detect the anatomical object 30 and/or the surrounding tissue 32. In addition, the deep neural network may also be trained to locate and segment the anatomical object 30 and/or the surrounding tissue 32. In particular embodiments, differences between training the deep neural network to locate the anatomical object 30 and/or the surrounding tissue 32 versus training the deep neural network to segment the anatomical object 30 and/or the surrounding tissue 32 include how the data is labeled for training and architectural details. As used herein, "segmentation" generally refers to a partition of an image into several coherent parts, but typically does not attempt to understand what such parts represent. On the other hand "semantic segmentation" generally attempts to partition the image into semantically meaningful parts, and to classify each part into one of the pre-determined classes.

Referring still to FIG. 3, as shown at 108, the processor(s) 16 may also be configured to label the anatomical object(s) 30 and/or surrounding tissue 32 on the image 14. Thus, as shown at 110, the method 100 also includes displaying the labeled image to a user. More specifically, in certain embodiments, the processor(s) 16 may be configured to outline the anatomical object(s) 30 and/or the surrounding tissue 32 on the image 14. For example, as shown in FIGS. 4 and 5, the brachial plexus 34 (i.e. the anatomical object 30) is outlined with a border having a first thickness or pattern. In addition, as shown, various surrounding tissues 32 can be outlined with a border having a second thickness that different from than the first thickness or pattern that is used to outline the brachial plexus 34. As such, a user can easily identify and distinguish the anatomical object(s) 30 of interest from the surrounding tissue 32.

In further embodiments, the processor(s) 16 may be configured to overlay a descriptive label atop the anatomical object(s) 30 and/or surrounding tissue 32 on the image 14. For example, as shown in FIG. 4, the surrounding tissue 32 may be numbered and labeled as landmarks 42 (e.g. on the right side of the image 14) for easy identification via a physician. Alternatively, as shown in FIG. 5, the surrounding tissue 32 may be identified and distinguished by line type and identified as landmarks 42 particularly illustrating a location within the body of the patient. In still another embodiment, as shown in FIG. 6, the surrounding tissue 32 may be shaded and labeled using a descriptive medical name. In further embodiments, as shown in FIG. 6, the anatomical object(s) 30 may also be further defined and/or segmented. As such, in the case of the brachial plexus 34, a user can easily identify separate nerves or nerve bundles during a nerve block procedure.

Figure 7:
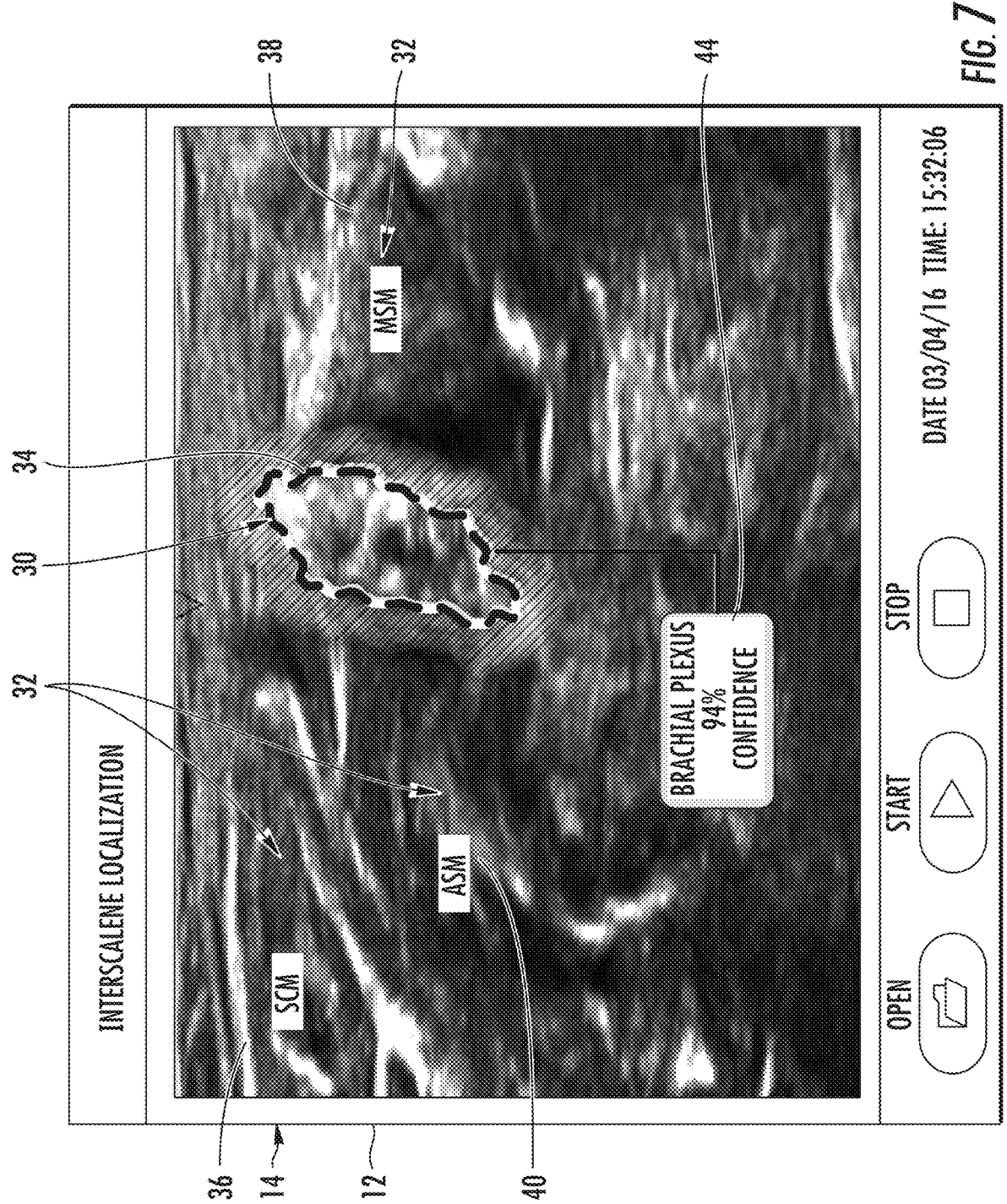
FIG. 7 illustrates a schematic diagram of one embodiment of a parameter space of an image generated by an imaging system according to the present disclosure, particularly illustrating interscalene localization of the brachial plexus of a patient.

In additional embodiments, as shown in FIGS. 4-7, the processor(s) 16 may also be configured to determine a confidence level 44 of the anatomical object 30 and/or the surrounding tissue 32. For example, as shown in FIGS. 4 and 5, the confidence level 44 of the location of the brachial plexus is located on the task bar of the image 14. Alternatively, as shown in FIGS. 6 and 7, the confidence level 44 of the location of the brachial plexus may be located within the parameter space 12 of the image 14, e.g. adjacent to the anatomical object 30.

Figure 8:
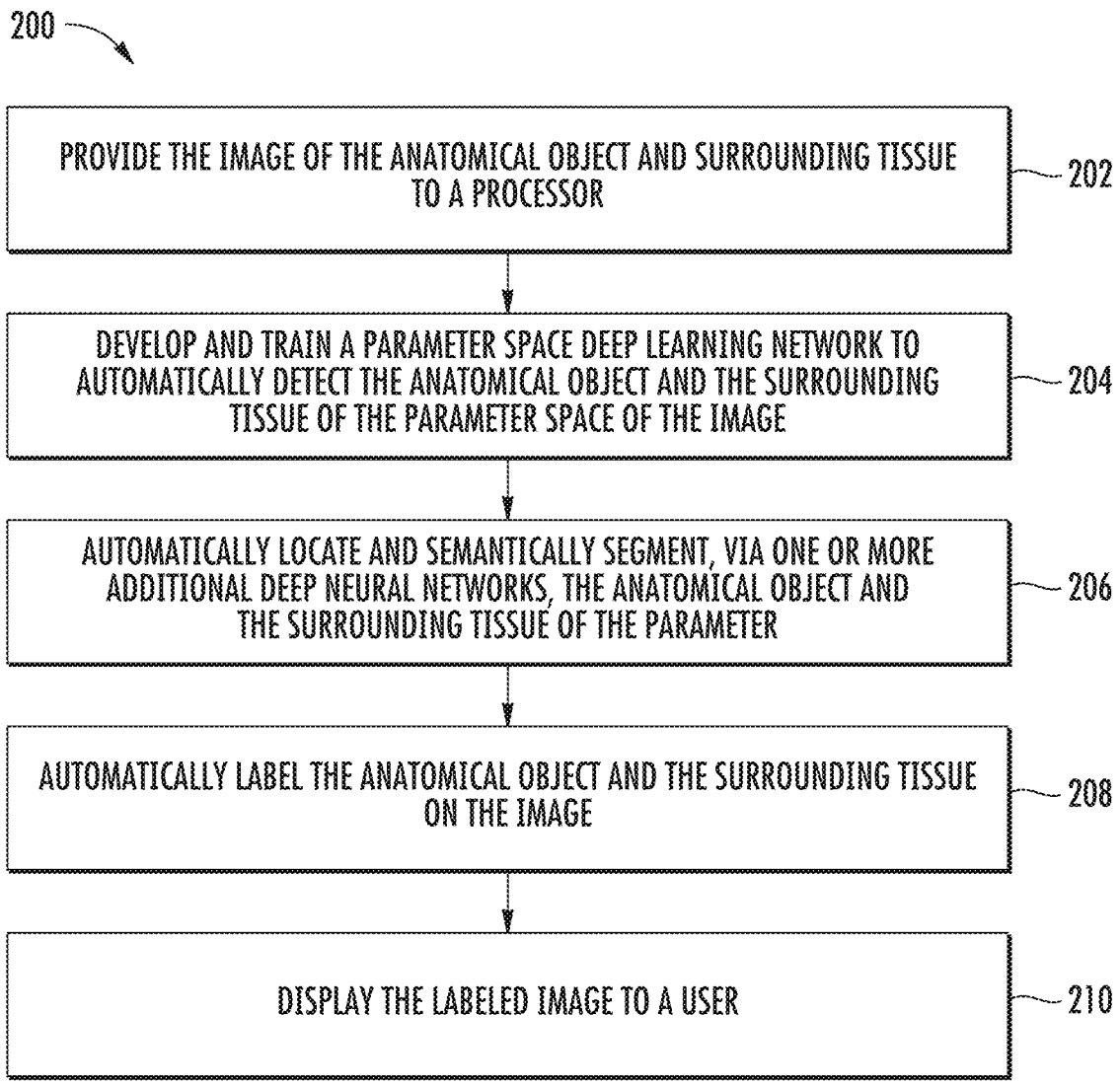
FIG. 8 illustrates a flow diagram of another embodiment of a method for automatic detection, localization, and segmentation of at least one anatomical object in a parameter space of an image generated by an imaging system according to the present disclosure.
Figure 9:
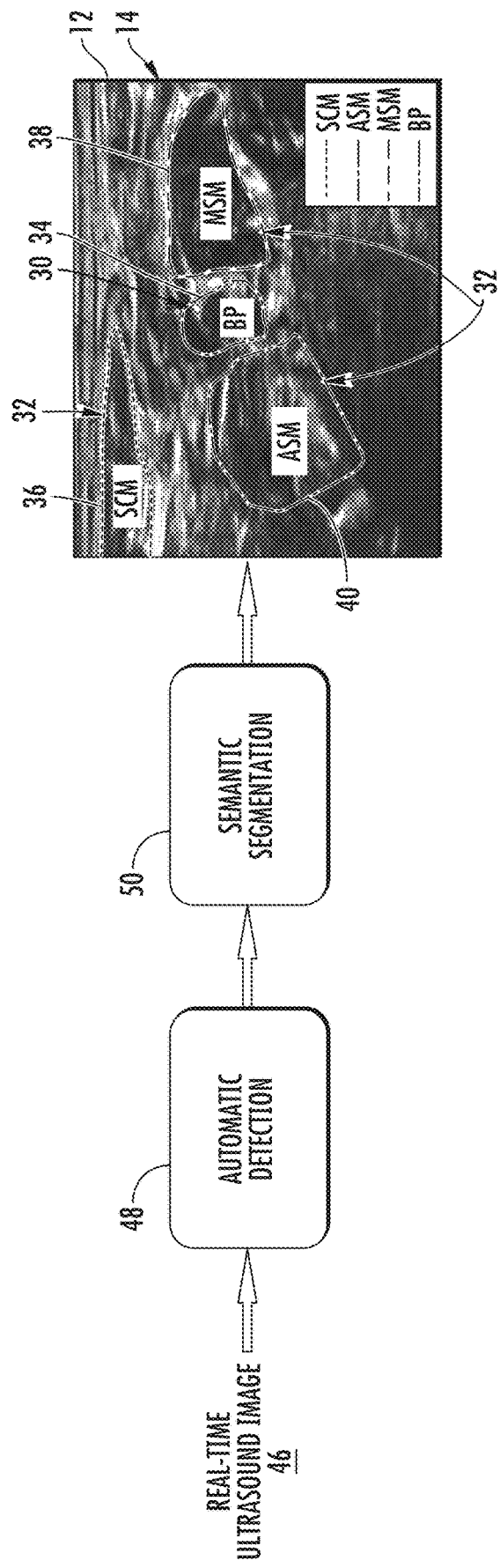
FIG. 9 illustrates a schematic diagram of a method for automatic detection, localization, and segmentation of at least one anatomical object in a parameter space of an image generated by an imaging system according to the present disclosure, particularly illustrating interscalene localization of the brachial plexus of a patient with the surrounding tissue labeled.

Referring now to FIGS. 8 and 9, a schematic diagram and a flow diagram of another embodiment of a method 200 for automatic detection, localization, and semantic segmentation of at least one anatomical object in a parameter space of an image generated by an imaging system are illustrated. As shown at 202 of FIG. 8, the method 200 includes providing the image of the anatomical object and surrounding tissue to a processor 16. For example, as shown in FIG. 9, a real-time ultrasound image 46 may be provided to the processor 16. As shown at 204 of FIG. 8, the method 200 includes developing and training a parameter space deep neural network to automatically detect the anatomical object and surrounding tissue of the parameter space. For example, as shown in FIG. 9, the processor 16 is configured to receive the real-time ultrasound image 46 and automatically detect the anatomical object and surrounding tissue of the parameter space at block 48. As shown at 206 of FIG. 8, the method 200 includes automatically locating and semantically segmenting, via one or more additional deep neural networks, the anatomical object and the surrounding tissue of the parameter space. For example, as shown in FIG. 9, the processor 16 is configured to implement semantic segmentation at block 50. As shown at 208 of FIG. 8, the method 200 includes automatically labeling, via the processor, the anatomical object and surrounding tissue on the image. As shown at 210 of FIG. 8, the method 200 includes displaying the labeled image to a user. For example, as shown in FIG. 9, the processor 16 is configured to display the labeled image 14 via the user display 20.

Turning now to FIG. 10, the present disclosure contemplates that, in some embodiments, the real time ultrasound image 46 that is provided to the processor 16 may be obtained from one imaging system (e.g., a first ultrasound machine A), while the dataset of images used to create the ground truth data for developing and training the deep learning network may be collected from various machines, such as the first ultrasound machine A, a second ultrasound machine B, a third ultrasound machine C, and etc. Thus, because the dataset of images used to create the ground truth data can include images captured from different imaging systems, the images in the dataset can vary significantly in terms of various characteristics including image size, intensity, contrast, texture, and the like. These variances can pose limitations on the use of a deep learning algorithm across different imaging system. FIG. 10 illustrates a schematic diagram of a method for pre-processing images generated by one or more imaging systems so that the images are consistent across, for instance, multiple ultrasound imaging systems, such as machine A, machine B, and machine C. Generally, data 52 from machines A, B, and C (e.g., the dataset of images) can be transformed (or pre-processed) at block 54, after which the data 52, which is now more consistent across the various machines A, B, and C, is used to create a trained algorithm at block 56 to achieve the desired output 58 despite obtaining the dataset of images from multiple ultrasound imaging systems.

More specifically, the typical process in developing a deep learning network includes collecting data from an imaging system (e.g., an ultrasound imaging machine), cleaning the images, annotating the images, and then using the images and annotations for developing learning-based algorithms as generally described above. However, one of the main challenges with the use of such algorithms is the aforementioned variability amongst different imaging systems, where captured images can vary in terms of image size, intensity, contrast, texture, etc. As such, the deep-learning network or learning-based algorithm that is trained using a particular imaging system can face difficulty in processing and inferring the desired output data and images captured from other imaging systems. The present disclosure overcomes this challenge by performing a pre-processing step on the data 52 coming from multiple different machines to transform the image dataset at block 54 into a consistent set of data that has been transformed so that the deep learning network can be trained more precisely and accurately at block 56, resulting in the desired output 58 (e.g., a robust deep learning networking). The pre-processing step or transformation at block 54 includes resizing images in the dataset into a fixed, consistent size and then applying imaging normalization techniques such as image histogram equalization and image histogram matching to improve the consistency between the various images, resulting in a set of equalized images obtained by adjusting the original image based on histogram equalization. Thus, the dataset input into the deep-learning network or algorithm can have similar statistical features that will ensure the desired output 58 across different imaging systems. As a result of the transformation step, the dataset can be converted into a consistent dataset for the deep-learning algorithm.

It should be understood that as used herein, the term "histogram" refers to a graphical representation showing a visual impression of the distribution of data. An image histogram is a specific type of histogram that acts as a graphical representation of the lightness/color distribution in a digital image, where the image histogram plots the number of pixels for each value. Further, as used herein, the term "histogram equalization" refers to a method in image processing of contrast adjustment using an image's histogram. The method usually increases the global contrast of many images, especially when the usable data of the image is represented by close contrast values. Through this adjustment, the intensities can be better distributed on the histogram. This allows for areas of lower local contrast to gain a higher contrast. Histogram equalization accomplishes this by effectively spreading out the most frequent intensity values. In addition, as used herein, the term "histogram matching" or "histogram specification" refers to the transformation of an image so that its histogram matches a specified histogram. This well-known histogram equalization method is a special case in which the specified histogram is uniformly distributed. Histogram matching can be used to normalize two images, such as when the images were acquired with different medical imaging devices.

Figure 13:
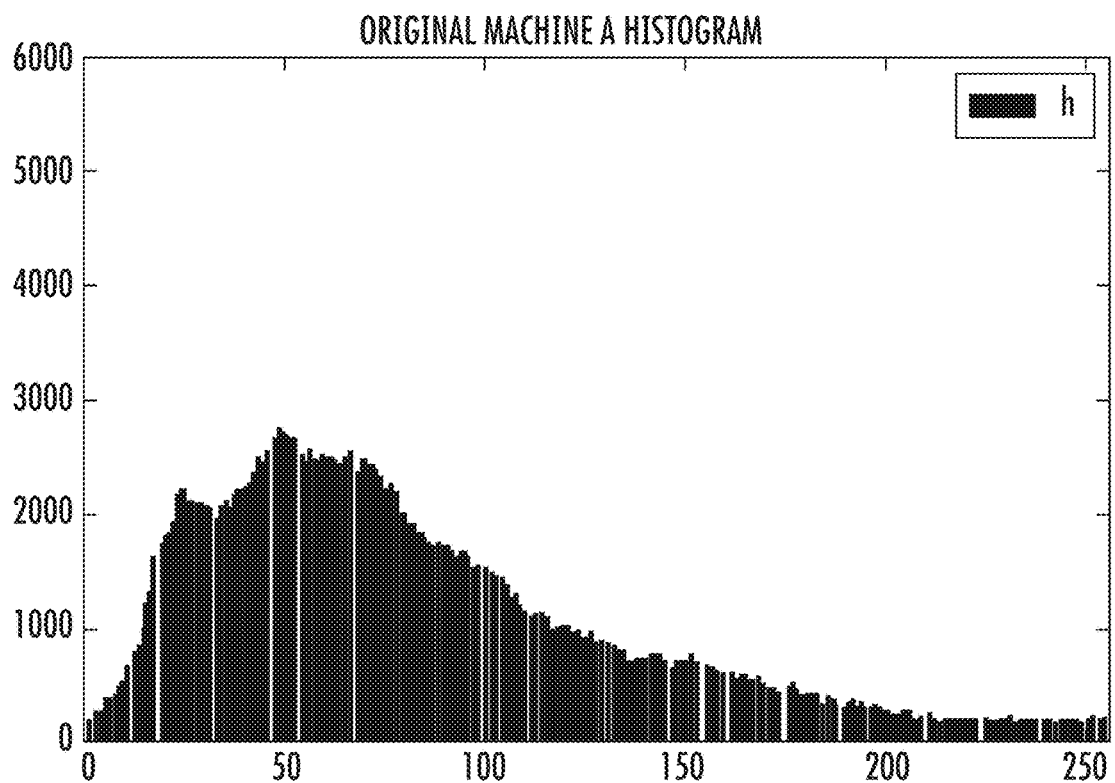
FIG. 13 illustrates a histogram from a first ultrasound machine (e.g., machine A) that has not been transformed according to the method of FIG. 10.
Figure 14:
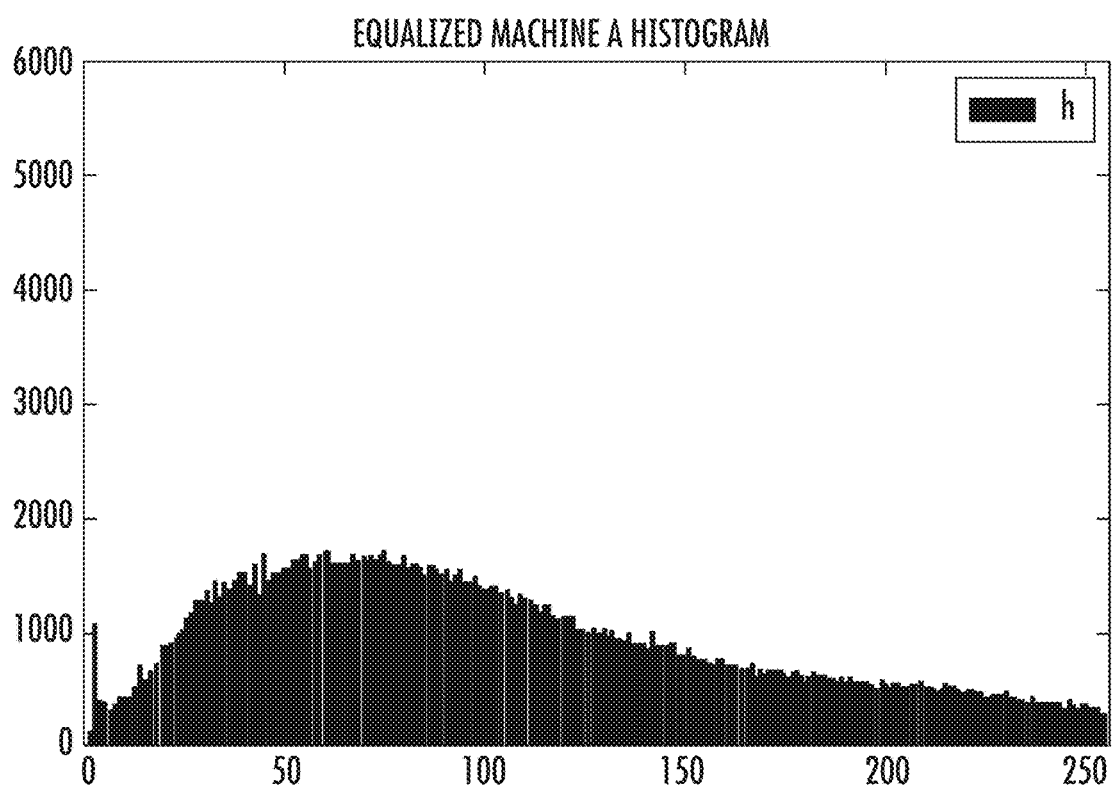
FIG. 14 illustrates a histogram from a first ultrasound machine (e.g., machine A) that has been transformed according to the method of FIG. 10.
Figure 15:
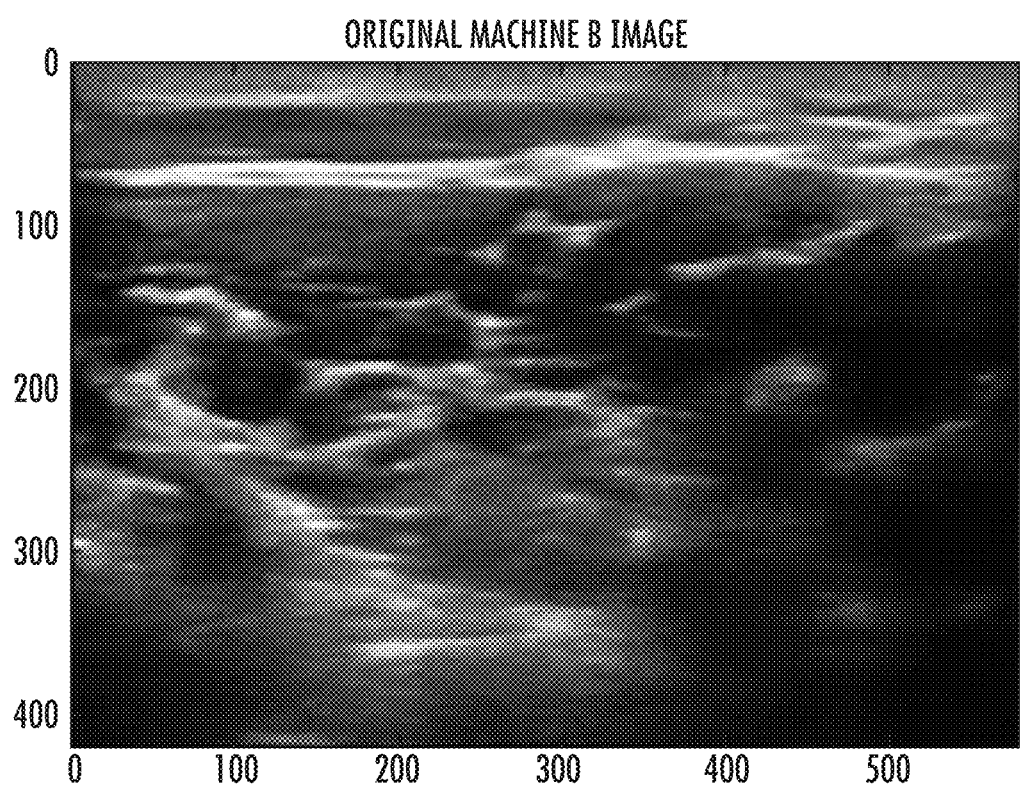
FIG. 15 illustrates an image from a second ultrasound machine (e.g., machine B) that has not been transformed according to the method of FIG. 10.
Figure 16:
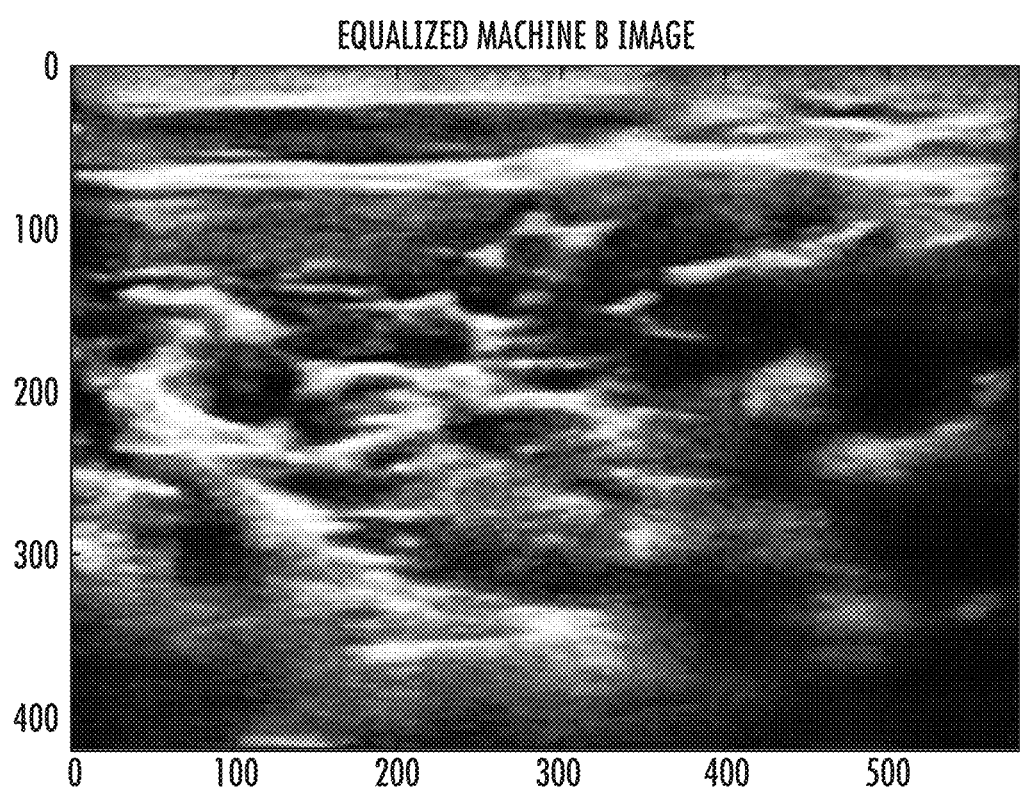
FIG. 16 illustrates an image from a second ultrasound machine (e.g., machine B) that has been transformed according to the method of FIG. 10.
Figure 17:
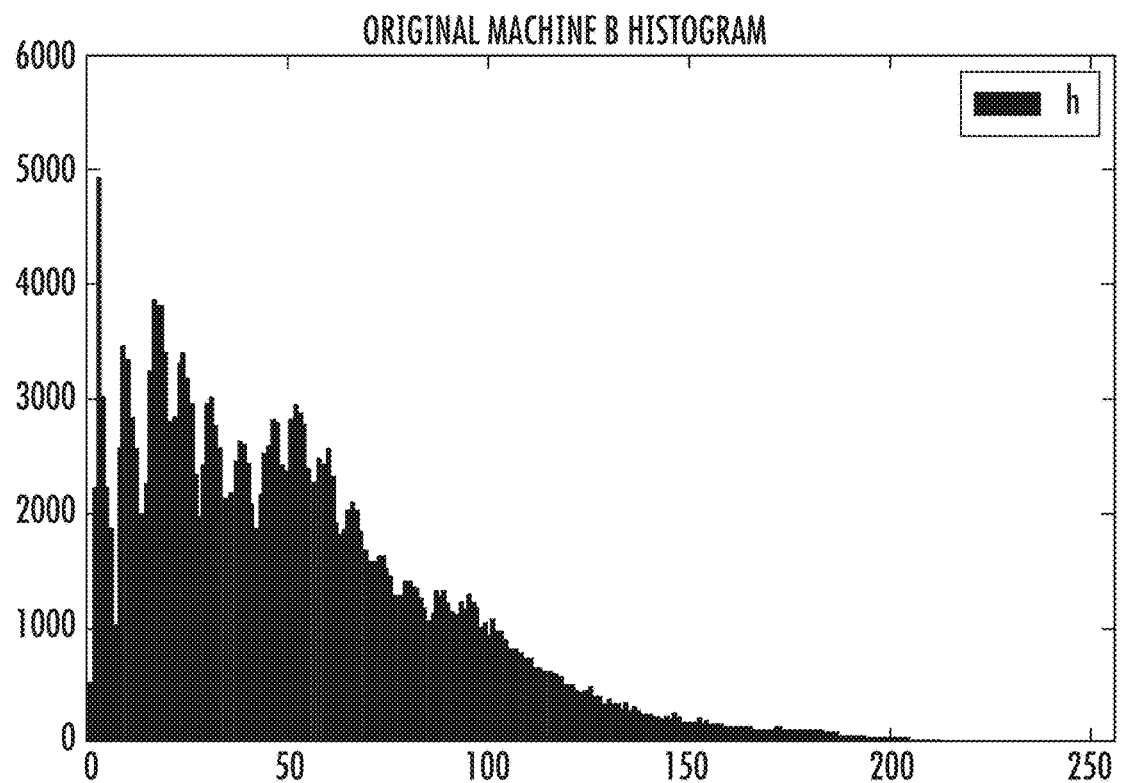
FIG. 17 illustrates a histogram from a second ultrasound machine (e.g., machine B) that has not been transformed according to the method of FIG. 10.
Figure 18:
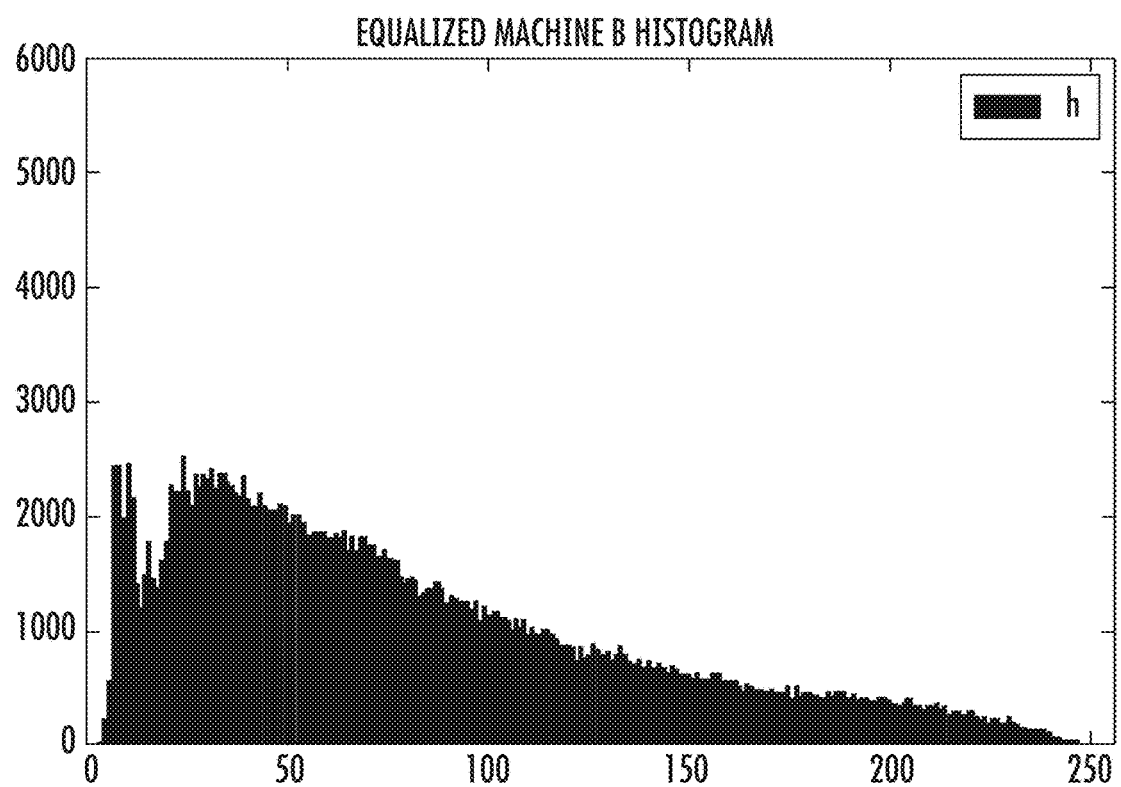
FIG. 18 illustrates a histogram from a second ultrasound machine (e.g., machine B) that has been transformed according to the method of FIG. 10.
Figure 19:
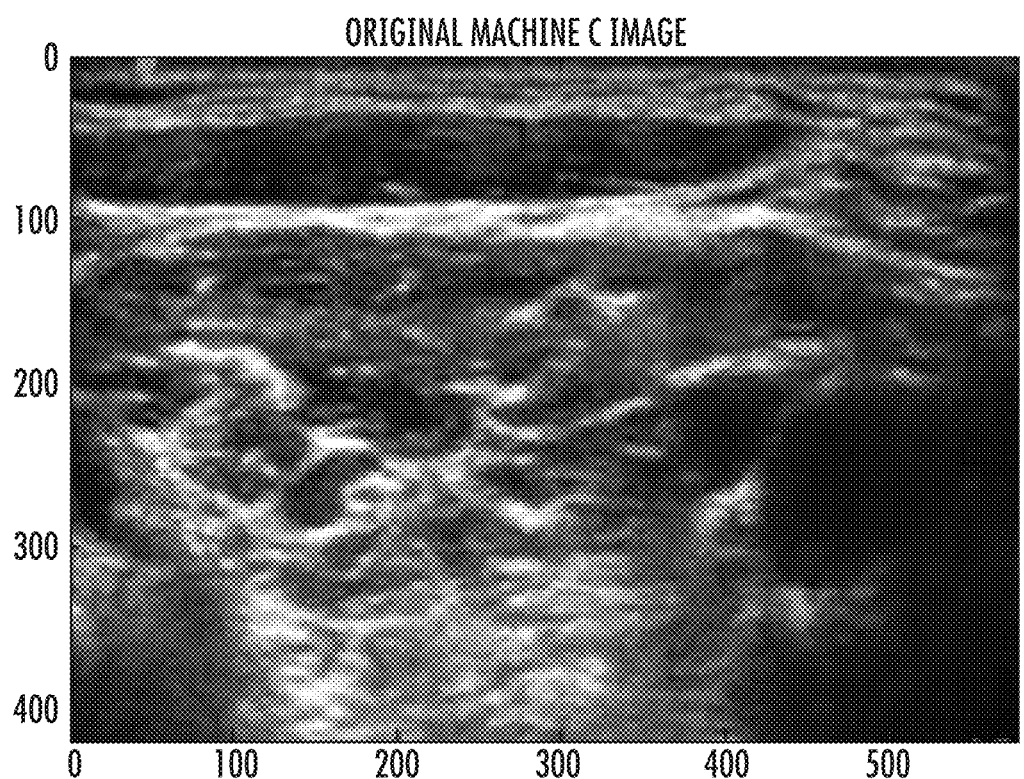
FIG. 19 illustrates an image from a third ultrasound machine (e.g., machine C) that has not been transformed according to the method of FIG. 10.
Figure 20:
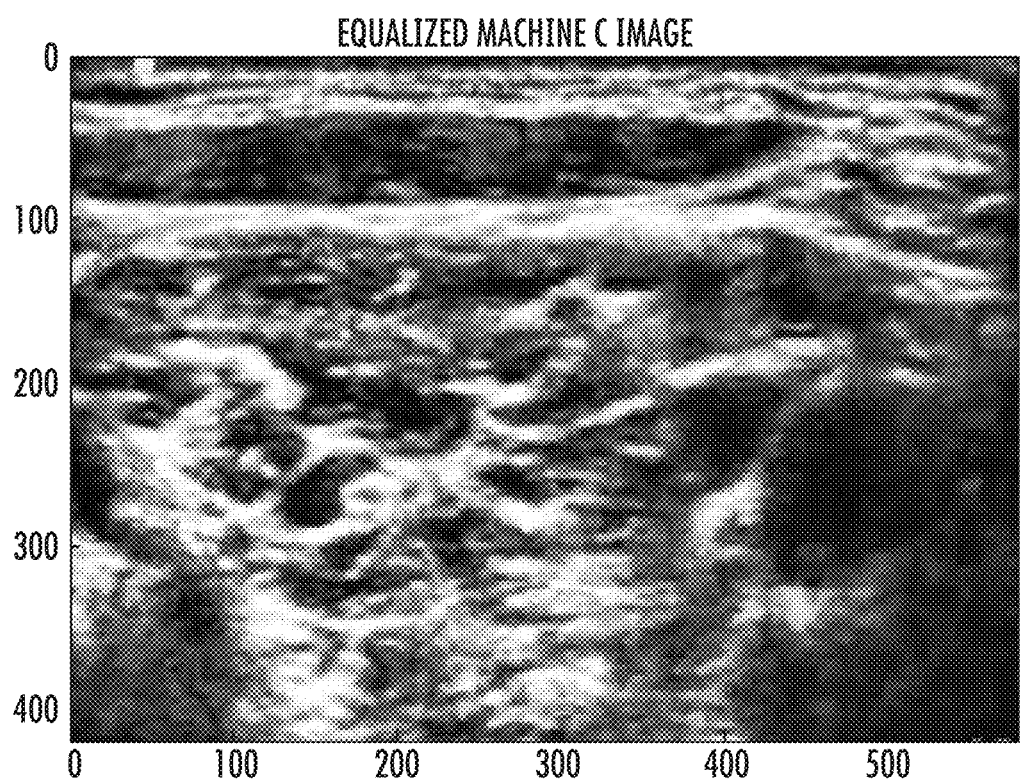
FIG. 20 illustrates an image from a third ultrasound machine (e.g., machine C) that has been transformed according to the method of FIG. 10.
Figure 21:
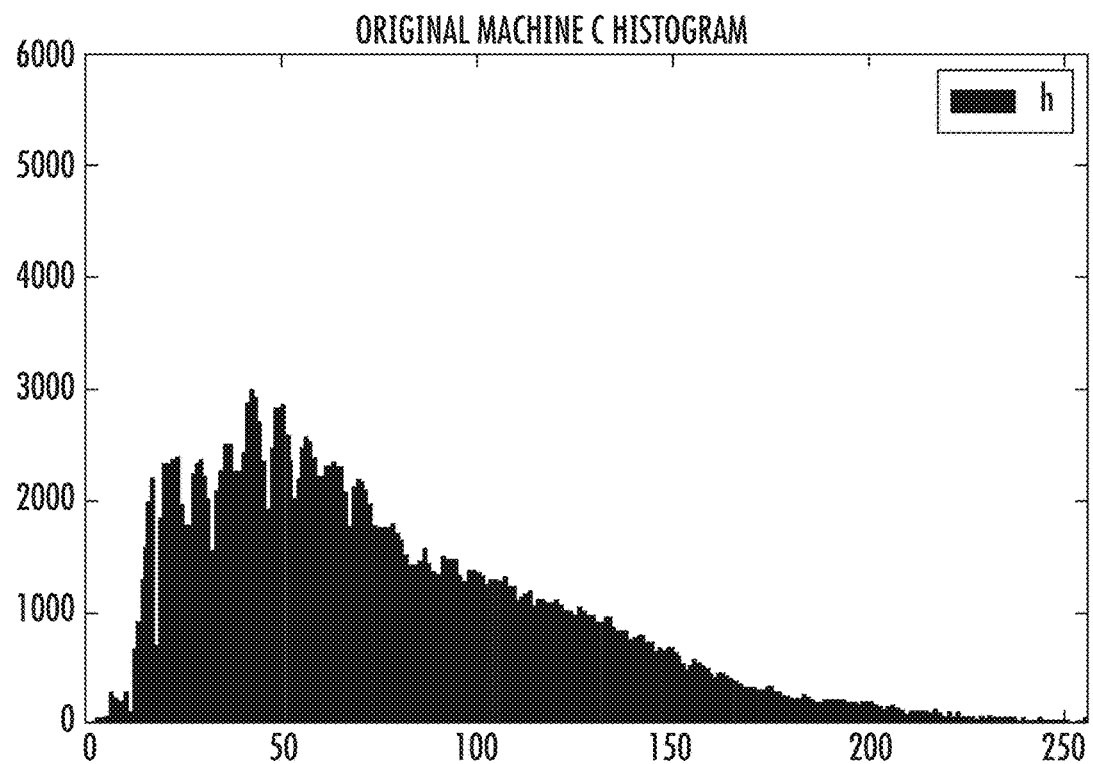
FIG. 21 illustrates a histogram from a third ultrasound machine (e.g., machine C) that has not been transformed according to the method of FIG. 10.
Figure 22:
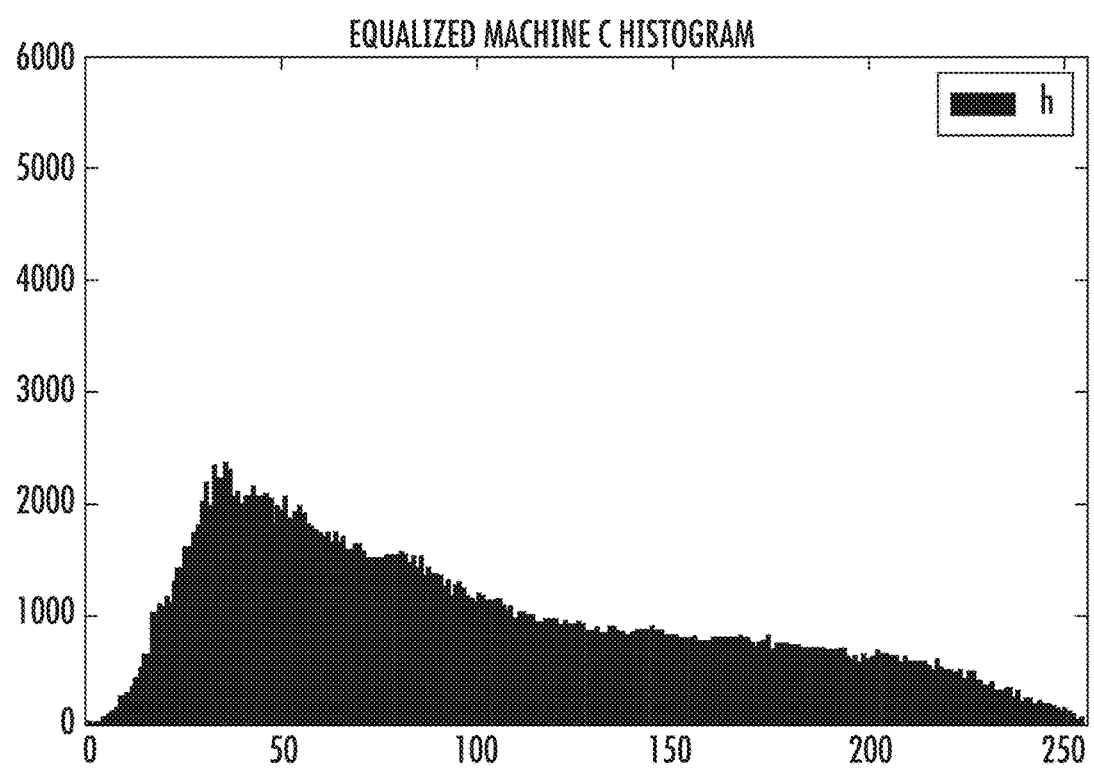
FIG. 22 illustrates a histogram from a third ultrasound machine (e.g., machine C) that has been transformed according to the method of FIG. 10.

FIGS. 11-22 depict images and their histograms taken from various ultrasound machines A, B, and C before and after transformation (e.g., normalization). Specifically, FIG. 11 illustrates an image from a first ultrasound machine (e.g., machine A) that has not been transformed according to the method of FIG. 10; FIG. 12 illustrates an image from a first ultrasound machine (e.g., machine A) that has been transformed according to the method of FIG. 10; FIG. 13 illustrates a histogram from a first ultrasound machine (e.g., machine A) that has not been transformed according to the method of FIG. 10; FIG. 14 illustrates a histogram from a first ultrasound machine (e.g., machine A) that has not been transformed according to the method of FIG. 10; FIG. 15 illustrates an image from a second ultrasound machine (e.g., machine B) that has not been transformed according to the method of FIG. 10; FIG. 16 illustrates an image from a second ultrasound machine (e.g., machine B) that has been transformed according to the method of FIG. 10; FIG. 17 illustrates a histogram from a second ultrasound machine (e.g., machine B) that has not been transformed according to the method of FIG. 10; FIG. 18 illustrates a histogram from a second ultrasound machine (e.g., machine B) that has not been transformed according to the method of FIG. 10; FIG. 19 illustrates an image from a third ultrasound machine (e.g., machine C) that has not been transformed according to the method of FIG. 10; FIG. 20 illustrates an image from a third ultrasound machine (e.g., machine C) that has been transformed according to the method of FIG. 10; FIG. 21 illustrates a histogram from a third ultrasound machine (e.g., machine C) that has not been transformed according to the method of FIG. 10; and FIG. 22 illustrates a histogram from a third ultrasound machine (e.g., machine C) that has not been transformed according to the method of FIG. 10. As shown in FIGS. 11-22, the various images and their respective histograms from different ultrasound machines are more consistent after undergoing the transformation step in block 54 of FIG. 10. In this manner, the deep learning network utilized in the method for automatic detection, localization, and segmentation of an anatomical object that is contemplated by the present disclosure can be machine agnostic.

Turning now to FIG. 23, the present disclosure also contemplates that, in some embodiments, various steps in the method for automatic detection, localization, and segmentation of the at least one anatomical object may be carried out using platforms with limited computational power such as central processing unit (CPU)-based computers, mobile phones, tablets, etc. as opposed to high computational platforms such as graphical processing units (GPUs) Existing methods for detection/recognition, localization, and segmentation of anatomical objects in medical images using machine learning, artificial intelligence, deep learning networks, etc. require GPU platforms to achieve real-time deployment time for applications such as ultrasound imaging. However, many medical imaging systems, such as ultrasound imaging systems, have limited computational power and mainly use CPUs shared for multiple tasks. Further, the industry trend for imaging and diagnosing devices is going toward using mobile and portable devices such as mobile phones, tablets, handheld computers, etc. This poses a barrier in deploying complex learning-based algorithms (based on artificial intelligence, machine learning, and deep learning networks) on such devices. The key factor in deploying such algorithms is the number of calculations and multiplications required to process a single frame (around several billion calculations). The system and method contemplated by the present disclosure provides automatic segmentation of anatomical objects implementable in devices with low computational power such as CPU-based computers, tablets, and mobile devices by employing multiple techniques reduce the computational complexity while maintaining the performance. To do so, a low complexity deep learning architecture for anatomical segmentation can be utilized by estimating the shape of anatomical objects as an ellipse. This observation gives the opportunity to predict ellipses 68 parameters (centers 70, major axes 72, minor axes 74, and rotating angle 76) for segmentation purposes as opposed to predicting every pixel in the image. Such architecture not only reduces the computational complexity but also increases the accuracy of detection and segmentation of an anatomical object.

Another bottleneck in computational complexity is related to the numerical precision of the parameters of the network. All learning-based algorithms require to be trained during a training process to learn and obtain the so-called weights of the network. Typically, 32-bit floating-point numbers are used for the weights. However, multiplication of floating point numbers is computationally expensive. Thus, the present disclosure contemplates the use of lower precision numbers such as 8-bit integer or 1-bit binary numbers can be instead used to represent the weights. This modification significantly reduces the number of calculations as well the memory requirement. FIG. 23 illustrates a schematic diagram of one embodiment of a method for automatically segmenting at least one anatomical object in a parameter space of an image generated by an imaging system using low computational power devices according to the present disclosure. As shown, the input real-time image 46 is processed by the network using a reduced number of binary weights 66 (e.g., 8-bit integers or 1-bit binary numbers) and for each anatomical object in the image 46, an ellipse 68 is predicted having a center 70, a major axis 72, a minor axis 74, and a rotating angle 76 such that the ellipse 68 fits to the anatomical object of interest.

The present disclosure also contemplates a method that can automatically detect and segment the anatomical object simultaneously rather than in two distinct steps. Referring now to FIG. 24, a schematic diagram of one embodiment of a method for the simultaneous automatic detection and segmentation of at least one anatomical object in a parameter space of an image generated by an imaging system according to the present disclosure is illustrated. For instance, the method includes inputting a real-time image 46, detecting the anatomy type 62 using, for instance, a deep convolutional neural network 60, and providing a segmentation mask 64 simultaneously after the algorithm is trained.

The method of the present disclosure can employ deep learning algorithms and allows for both detection and segmentation in one step to make the image detection and segmentation process automatic, robust, accurate, and efficient. A schematic diagram of the method is shown in FIG. 24. The algorithm automatically converts low level pixels in medical images into high level features and abstract concepts using deep convolutional neural networks. It then uses these extracted features to detect the anatomical scene or object along with the confidence level of the recognized scene or object. At the same time, if the scene or object is recognized, it will be segmented into meaningful anatomical objects for further processing and clinical evaluation by clinicians. To be able to deploy the network in real world applications, the algorithm needs to be trained during a training process. To do so, data is collected, manually annotated by experts and used to train the left half-side of the algorithm (FIG. 24 up until anatomy type 62) to generate a specific anatomical object or anatomy type 62. Then, the left half-side of the algorithm is kept unchanged and the rest of the algorithm is fine-tuned to provide the segmentation masks 64 for the specific anatomical object or anatomy type 62. Once the training process is done, the algorithm will provide the user with the automatically detected anatomical object or anatomy type and its respective segmentation mask simultaneously.

Figure 25:
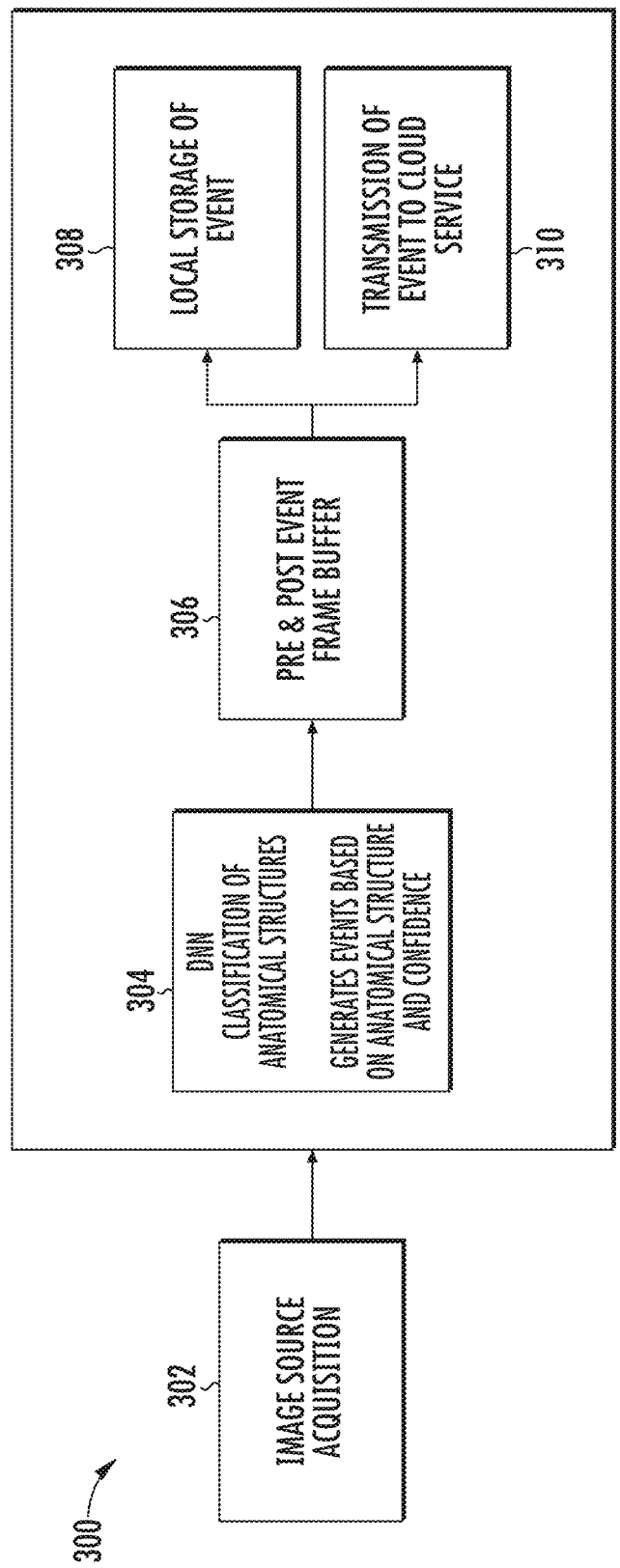
FIG. 25 illustrates a flow diagram of one embodiment of a method for providing an image to a processor by identifying the image from within a video stream according to the present disclosure.

Turning now to FIG. 25, the present disclosure contemplates that, in some embodiments, the real time ultrasound image 46 that is provided to the processor 16 and the dataset of images used to create the ground truth data for developing and training the deep learning network may be obtained from a video stream. A flow diagram of one embodiment of a method for providing an image to a processor by identifying the image from within a video stream according to the present disclosure is illustrated in FIG. 25, where the method 300 involves a first step of image source acquisition 302, followed by deep neural network classification of one or more anatomical structures and the generation of events based on the anatomical structures and confidence levels achieved 304, followed by pre-event and post event frame buffering 306. Thereafter, the event can be stored locally as shown in step 308, or the event can be transmitted to a cloud service as shown in step 310.

More specifically, the method 300 focuses on a scalable way to collect multiple images of interest from medical professionals as they perform nerve block procedures in order to collect ground truth data that is annotated by the medical professionals for developing a deep learning network (e.g., a deep neural network), where the feedback loop of annotated images can be updated with additional ground truth data over time to enhance the accuracy of the system. The deep learning network is then used to identify, from a video stream or any other manner of providing images collected from an ultrasound imaging system, at least one anatomical object of interest. The deep learning network can remotely identify frames of interest from a particular video stream, where the frames are collected, stored locally or transmitted to a cloud service, and then analyzed using the deep learning network to identify within a certain confidence threshold, at least one specific anatomical objects of interest. The method includes a pre-event buffering step and a post-event buffering step to ensure that the video frames that are recorded leading up to the identification of the anatomical object and the video frames that are recorded immediately after identifying the anatomical object of interest are captured. Further, the method contemplates the ability to store the ground truth data locally or on a cloud service, where the data can be transmitted back for annotation and/or additional analysis to improve the deep learning network.

Figure 26:
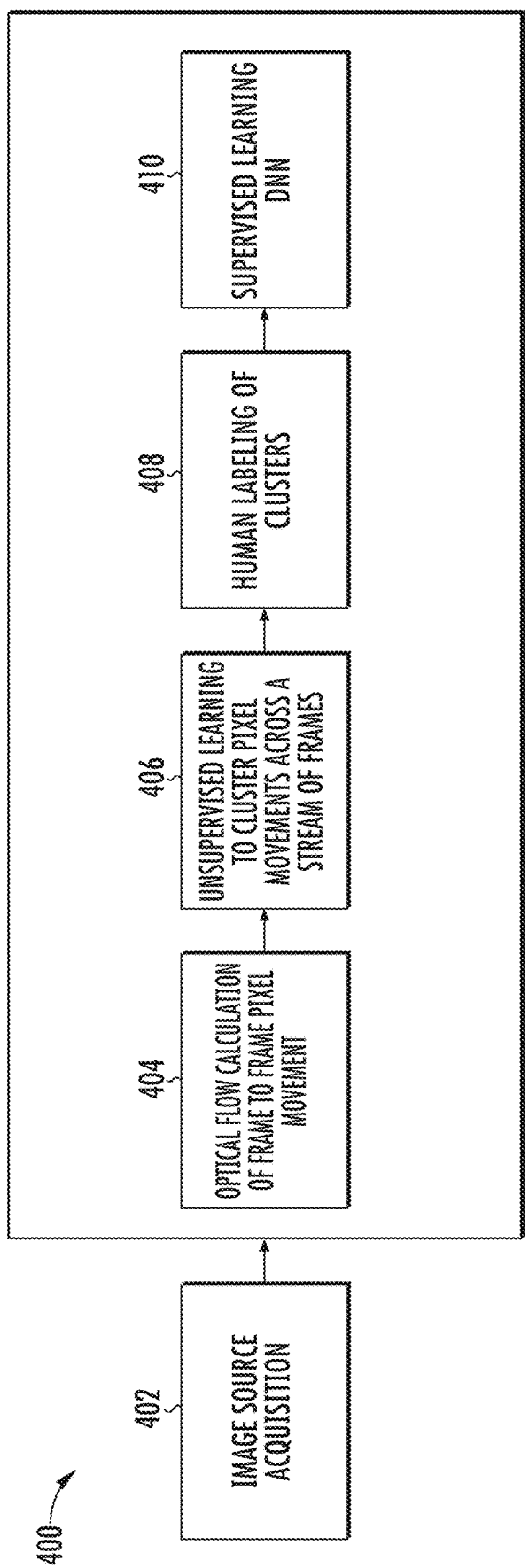
FIG. 26 illustrates a flow diagram of one embodiment of a method for automatically detecting the parameter space of an image containing an anatomical object and surrounding tissue by training a deep learning network, where training the deep learning network includes identifying and annotating at least one anatomical object in a parameter space of the image within a video stream according to the present disclosure.

For instance, as shown in FIG. 26, a medical professional can identify and annotate at least one anatomical object in the video stream. Such a method 400 involves the steps of image source acquisition 402, performing an optical flow calculation of frame to frame pixel movements 404, unsupervised learning to cluster pixel movements across a video stream of frames 406, and human labeling of the clusters of pixel movements 408, where the clusters are then used for supervised learning within the deep neural network at step 410. For instance, using optical flow frame to frame movement of pixels followed by an unsupervised learning process can be used to cluster the movement of pixels into a group, where the groups are identified across a range of frames and provided to the user (e.g., medical professional) to provide a logical label, where the labeled frames are then used in a supervised learning process by the deep neural network. Typically, using optical flow makes it difficult to achieve good results with images obtained from ultrasound imaging systems due to the speckled nature of the input images. As such, the use of clustering in an unsupervised learning environment can be used to remove extraneous outputs and cluster the pixel movement into more logical groupings, such as a group of pixels moving along a common vector path, which can result in improved accuracy when utilizing the deep neural network.

Figure 27:
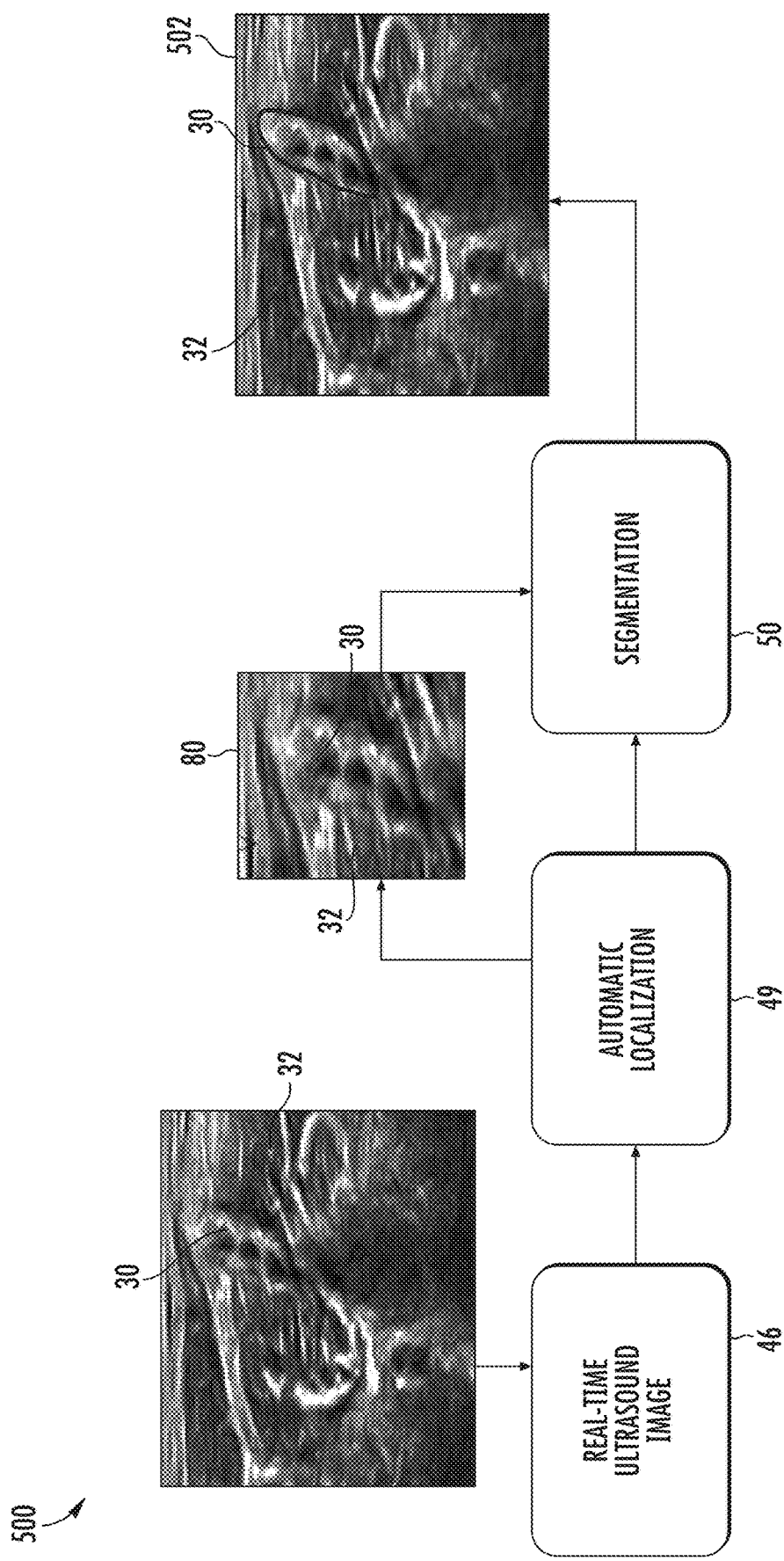
FIG. 27 illustrates a flow diagram of one embodiment of a method for automatically localizing and segmenting or extracting an area of interest around an anatomical object such as the brachial plexus (BP) from a real-time ultrasound image.

Referring now to FIG. 27, the present invention also contemplates a method and system for automatically localizing and segmenting or extracting an area of interest around an anatomical object such as the brachial plexus (BP) from a real-time ultrasound image. Specifically, method 500 includes obtaining a real-time ultrasound image 46 and automatically selecting an area of interest 80 from the real-time ultrasound image 46 for use in the automatic localization 49 of an anatomical object 30 and/or surrounding tissue 32. By extracting the area of interest 80 from the real-time ultrasound image 46, the resulting area of interest 80 is output as a cropped image 502 that smaller in size the original field of view yet still contains the anatomical object 30 and part of the surrounding tissue 32. The cropped image 502 is easier to process, and the methods and systems contemplated by the present invention can use the cropped image 502 as the input of the deep learning networks or algorithms of the present invention during segmentation 50 of the anatomical object 30 of interest (e.g., the brachial plexus) with high accuracy. For example, the present inventors have found that because the interscalene brachial plexus is typically smaller compared to surrounding tissues and because it can have various orientations and shapes depending on, for instance, image acquisition conditions, it can be difficult to segment the brachial plexus with high accuracy. However, extracting an area of interest around the brachial plexus before automatically locate and segment the brachial plexus via a deep learning network or algorithm can improve accuracy because the field of view of the image is smaller.

Turning now to FIG. 28, the present invention also contemplates a method for automatic data cleaning where a region of interest is detected in an original image, where the clean, cropped version of the original image is used in subsequent steps such as image annotations, deep learning, etc. For instance, method 600 contemplates obtaining an original ultrasound image 46 of an anatomical object and surrounding tissue in step 602, automatically extracting or cropping a region of interest 82 from the original ultrasound image in step 604, and then outputting the cropped region of interest 82 in 606 for further analysis such as annotating, deep learning, localization, segmentation, etc. Such data cleaning that is carried out automatically by the system of the present invention before providing the ultrasound image to a processor can help accelerate the data pipeline for the deep learning-based methods described herein.

Specifically, the data cleaning contemplated by the present invention can solve numerous problems with the analysis of medical images that is required for learning-based methods. Data cleaning is useful in medical image analysis such as anatomy detection and segmentation because, typically, a large dataset of medical images of various patients taken from various medical devices are collected and fed to a data pipeline to prepare the dataset for use in a learning-based method. The collected images may include anatomy visualization of patients which can define a particular region of interest containing an anatomical object to be detected, located, and segmented. In addition, textual information (e.g., date, time, settings, logos, etc.) can exist around the region of interest but they are not needed for the image analysis required by the learning-based methods of the present invention, yet this information takes up data storage space and can slow down processing times. As such, the additional information, such as textual information, around the region of interest can be removed from the images. Further, in contrast to manual-based methods of cropping, the cropping contemplated by the present invention for the purpose of data cleaning can be done automatically, which reduces the amount of errors, saves time, and is more scalable than manual cropping.

To automatically crop the additional information from original ultrasound images, image processing algorithms (e.g., intensity thresholding, deformable models, etc.) can be used to automatically find the region of interest and crop it out from the original ultrasound images. The resulting output is a clean version of the original ultrasound image that can then be used for subsequent steps in the data pipeline such as image annotation, training, localization, segmentation, etc. The algorithm is automatic, fast, and accurate with low computational complexity and can be executed on a typical computer to perform the task in a short time for large datasets. The algorithm separates the region of interest from the original image on the pixel level, and determination of the difference in pixels allows for a comparison of the pixel values to draw a boundary around the region of interest so that the region of interest can be automatically cropped from the original image and used in subsequent steps.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for automatic detection, localization, and segmentation of at least one anatomical object in an image generated by an imaging system, the method comprising:
providing the image of the anatomical object and surrounding tissue to a processor;
developing and training a deep learning network comprising one or more convolutional neural networks to automatically detect the anatomical object and the surrounding tissue in the image;
automatically locating and segmenting, via an additional convolutional neural network, the anatomical object and the surrounding tissue in the image, wherein the one or more convolutional neural networks, the additional convolutional neural network, or both utilize 8-bit integer or 1-bit binary number weights;
automatically labeling the anatomical object and the surrounding tissue on the image; and
displaying the labeled image to a user.

2. The method of claim 1, wherein the image is a normalized image, wherein the normalized image is pre-processed to adjust for size, intensity, contrast, texture, or a combination thereof.

3. The method of claim 1, wherein the image is provided from a frame in a video stream, wherein the frame is stored locally or on a cloud service.

4. The method of claim 1, wherein automatically detecting the anatomical object and automatically locating and segmenting the anatomical object occur simultaneously in a single step and utilize a central processing unit (CPU)-based computer, a tablet, or a mobile device.

5. The method of claim 1, wherein automatically locating and segmenting the anatomical object involves estimating a shape of the anatomical object as an ellipse.

6. The method of claim 1, further comprising training the deep learning network to automatically detect the anatomical object and surrounding tissue via ground truth data,
wherein developing and training the deep learning network to automatically detect the anatomical object and surrounding tissue in the image further comprises:
scanning and collecting a dataset of images of the anatomical object and surrounding tissue from a plurality of patients,
annotating the dataset of images based on user input to create the ground truth data,
dividing the dataset of images and the ground truth data into a training dataset and a validation dataset, and
utilizing the training dataset to train the deep learning network.

7. The method of claim 6, further comprising normalizing the dataset of images by pre-processing the dataset of images to adjust for size, intensity, contrast, texture, or a combination thereof.

8. The method of claim 6, wherein the dataset of images is collected from multiple data imaging systems.

9. The method of claim 6, wherein the dataset of images comprises frames collected from at least one video stream, wherein the frames are stored locally or on a cloud service.

10. The method of claim 9, wherein annotating the dataset of images based on user input to create the ground truth data comprises:
performing an optical flow calculation of frame to frame pixel movements,
facilitating unsupervised learning to cluster the frame to frame pixel movements across the at least one video stream into groups, and
providing the groups of pixel movements to the user for identification and labeling across a range of frames.

11. The method of claim 6, wherein utilizing the training dataset to train the deep learning network further comprises optimizing a cost function to minimize an error between an output of the deep learning network and the ground truth data, wherein optimizing the cost function to minimize the error further comprises utilizing a stochastic gradient descent (SGD) algorithm that iteratively processes portions of the ground truth data and adjusts one or more parameters of the deep learning network based on the error between the output of the deep learning network and the ground truth data.

12. The method of claim 11, further comprising, after optimizing the cost function, utilizing the deep learning network in real-time to automatically provide predictions on the validation data and comparing the predictions with the ground truth data.

13. The method of claim 6, wherein annotating the dataset of images based on user input to create the ground truth data further comprises manually identifying and annotating the anatomical object and surrounding tissue in each image of the dataset.

14. The method of claim 1, wherein automatically locating and segmenting the anatomical object and the surrounding tissue in the image further comprises segmenting the anatomical object and the surrounding tissue via semantic segmentation.

15. The method of claim 1, further comprising initially training the deep learning network to automatically detect the anatomical object and the surrounding tissue offline, further comprising continuously training the deep learning network to automatically detect the anatomical object and the surrounding tissue online.

16. The method of claim 1, wherein labeling the anatomical object and the surrounding tissue on the image further comprises at least one of outlining or shading at least one of the anatomical object and the surrounding tissue on the image or overlaying a descriptive label atop each of the at least one anatomical object and the surrounding tissue, wherein automatically locating and segmenting the anatomical object and the surrounding tissue in the image via the additional convolutional network comprises extracting an area of interest around the anatomical object from the image, and wherein the image of the anatomical object and surrounding tissue is automatically cropped prior to providing the image to the processor.

17. An imaging system, comprising:
at least one processor configured to perform one or more operations, the one or more operations comprising:
receiving an image of at least one anatomical object and surrounding tissue,
developing and training a deep learning network having one or more convolutional neural networks to automatically detect the anatomical object and the surrounding tissue in the image,
automatically locating and segmenting, via an additional deep learning network, the anatomical object and the surrounding in the image, wherein the one or more convolutional neural networks, the additional convolutional neural network, or both utilize 8-bit integer or 1-bit binary number weights, and
automatically labeling the anatomical object and the surrounding tissue on the image; and a user display configured to display the labeled image to a user.

18. The system of claim 17, wherein the imaging system comprises at least one of an ultrasound imaging system, a computer tomography (CT) scanner, or a magnetic resonance imaging (MRI) scanner, and wherein the image is a normalized image, wherein the normalized image is pre-processed to adjust for size, intensity, contrast, texture, or a combination thereof.

19. The system of claim 17, wherein the image is provided from a frame in a video stream, wherein the frame is stored locally or on a cloud service.

20. The system of claim 17, wherein automatically detecting the anatomical object and automatically locating and segmenting the anatomical object occur simultaneously in a single step, wherein automatically detecting the anatomical object and automatically locating and segmenting the anatomical object utilize a central processing unit (CPU)-based computer, a tablet, or a mobile device.

21. The system of claim 17, wherein automatically locating and segmenting the anatomical object involves estimating a shape of the anatomical object as an ellipse.

22. The system of claim 17, wherein automatically locating and segmenting the anatomical object and the surrounding tissue in the image via the additional deep learning network comprises extracting an area of interest around the anatomical object from the image, wherein the system is configured to automatically crop the image of the at least one anatomical object and surrounding tissue before the image is received by the at least one processor.

23. A method for automatic detection, localization, and semantic segmentation of at least one anatomical object in an image generated by an imaging system, the method comprising:
providing the image of the anatomical object and surrounding tissue to a processor;
developing and training a deep learning network to automatically detect the anatomical object and the surrounding tissue in the image;
automatically locating and semantically segmenting, via one or more deep learning algorithms, the anatomical object and the surrounding tissue in the image, wherein the one or more convolutional neural networks, the additional convolutional neural network, or both utilize 8-bit integer or 1-bit binary number weights;
automatically labeling the anatomical object and the surrounding tissue on the image; and
displaying the labeled image to a user.

24. The method of claim 23, wherein the image is a normalized image, wherein the normalized image is pre-processed to adjust for size, intensity, contrast, texture, or a combination thereof.

25. The method of claim 23, wherein the image is provided from a frame in a video stream, wherein the frame is stored locally or on a cloud service.

26. The method of claim 23, wherein automatically detecting the anatomical object and automatically locating and segmenting the anatomical object occur simultaneously in a single step, and wherein automatically detecting the anatomical object and automatically locating and segmenting the anatomical object utilize a central processing unit (CPU)-based computer, a tablet, or a mobile device.

27. The method of claim 23, wherein automatically locating and segmenting the anatomical object involves estimating a shape of the anatomical object as an ellipse.

28. The method of claim 23, further comprising training the deep learning network to automatically detect the anatomical object and surrounding tissue via ground truth data, wherein developing and training the deep learning network to automatically detect the anatomical object and surrounding tissue in the image further comprises:
scanning and collecting a dataset of images of the anatomical object and surrounding tissue from a plurality of patients,
annotating the dataset of images based on user input to create the ground truth data,
dividing the dataset of images and the ground truth data into a training dataset and a validation dataset, and
utilizing the training dataset to train the one or more deep learning algorithms.

29. The method of claim 28, further comprising normalizing the dataset of images by pre-processing the dataset of images to adjust for size, intensity, contrast, texture, or a combination thereof, wherein the dataset of images is collected from multiple data imaging systems, wherein the dataset of images comprises frames collected from at least one video stream, wherein the frames are stored locally or on a cloud service.

30. The method of claim 28, wherein annotating the dataset of images based on user input to create the ground truth data comprises:
performing an optical flow calculation of frame to frame pixel movements,
facilitating unsupervised learning to cluster the frame to frame pixel movements across the at least one video stream into groups, and
providing the groups of pixel movements to the user for identification and labeling across a range of frames, and
wherein utilizing the training dataset to train the deep learning network further comprises optimizing a cost function to minimize an error between an output of the one or more deep learning algorithms and the ground truth data.

31. The method of claim 23, wherein automatically locating and segmenting the anatomical object and the surrounding tissue in the image via one or more deep learning algorithms comprises extracting an area of interest around the anatomical object from the image, wherein the image of the anatomical object and surrounding tissue is automatically cropped prior to providing the image to the processor.

* * * * *